(12) United States Patent
Kusens et al.

(10) Patent No.: US 11,443,602 B2
(45) Date of Patent: *Sep. 13, 2022

(54) METHODS AND SYSTEMS FOR DETECTING PROHIBITED OBJECTS

(71) Applicant: CERNER INNOVATION, INC., Kansas City, KS (US)

(72) Inventors: Michael Kusens, Cooper City, FL (US); Neil Kusens, Sherman Oaks, CA (US)

(73) Assignee: CERNER INNOVATION, INC., North Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/152,403

(22) Filed: Jan. 19, 2021

(65) Prior Publication Data

US 2021/0142633 A1   May 13, 2021

Related U.S. Application Data

(63) Continuation of application No. 16/181,897, filed on Nov. 6, 2018, now Pat. No. 10,922,936.

(51) Int. Cl.
*G08B 13/196* (2006.01)
*G06T 7/70* (2017.01)
(Continued)

(52) U.S. Cl.
CPC .......... *G08B 13/19602* (2013.01); *G06T 7/70* (2017.01); *G06V 10/751* (2022.01);
(Continued)

(58) Field of Classification Search
CPC .......... G08B 13/19602; G06K 9/6202; G06K 9/0077; G06T 7/70; G06T 2207/30196; G06T 2207/30232; G06T 2207/10028
See application file for complete search history.

(56) References Cited

U.S. PATENT DOCUMENTS 4,669,263 A   6/1987   Sugiyama
4,857,716 A   8/1989   Gombrich et al.
(Continued)

FOREIGN PATENT DOCUMENTS

DE   19844918 A1   4/2000
WO   2007/081629 A2   7/2007
(Continued)

OTHER PUBLICATIONS

US 9,948,899 B1, 04/2018, Kusens (withdrawn)
(Continued)

*Primary Examiner* — Ming Y Hon
(74) *Attorney, Agent, or Firm* — Shook, Hardy & Bacon L.L.P.

(57) ABSTRACT

A prohibited object detection system detects improper use of an object in an area being monitored. An image of an object detected in an area associated with a monitored individual, such as a patient room, is collected, and the system identifies reference points on the object. The system may compare the reference points to reference points of known improper uses of the object. The system may determine whether the detected object in the improper use position is in proximity to at least a portion of the monitored individual or other person within the monitored area. One or more designated recipients may be alerted if the object is in a position consistent with an improper use.

20 Claims, 19 Drawing Sheets

(51) Int. Cl.
  *G06V 10/75* (2022.01)
  *G06V 20/52* (2022.01)
(52) U.S. Cl.
  CPC .... *G06V 20/52* (2022.01); *G06T 2207/10028* (2013.01); *G06T 2207/30196* (2013.01); *G06T 2207/30232* (2013.01)

(56) References Cited

U.S. PATENT DOCUMENTS

| | | |
|---|---|---|
| 5,031,228 A | 7/1991 | Lu |
| 5,276,432 A | 1/1994 | Travis |
| 5,448,221 A | 9/1995 | Weller |
| 5,482,050 A | 1/1996 | Smokoff et al. |
| 5,592,153 A | 1/1997 | Welling et al. |
| 5,798,798 A | 8/1998 | Rector et al. |
| 5,838,223 A | 11/1998 | Gallant et al. |
| 5,915,379 A | 6/1999 | Wallace et al. |
| 5,942,986 A | 8/1999 | Shabot et al. |
| 6,050,940 A | 4/2000 | Braun et al. |
| 6,095,984 A | 8/2000 | Amano et al. |
| 6,160,478 A | 12/2000 | Jacobsen et al. |
| 6,174,283 B1 | 1/2001 | Nevo et al. |
| 6,188,407 B1 | 2/2001 | Smith et al. |
| 6,269,812 B1 | 8/2001 | Wallace et al. |
| 6,287,452 B1 | 9/2001 | Allen et al. |
| 6,322,502 B1 | 11/2001 | Schoenberg et al. |
| 6,369,838 B1 | 4/2002 | Wallace et al. |
| 6,429,869 B1 | 8/2002 | Kamakura et al. |
| 6,614,349 B1 | 9/2003 | Proctor et al. |
| 6,727,818 B1 | 4/2004 | Wildman et al. |
| 6,804,656 B1 | 10/2004 | Rosenfeld et al. |
| 7,015,816 B2 | 3/2006 | Wildman et al. |
| 7,122,005 B2 | 10/2006 | Shusterman |
| 7,154,397 B2 | 12/2006 | Zerhusen et al. |
| 7,237,287 B2 | 7/2007 | Weismiller et al. |
| 7,323,991 B1 | 1/2008 | Eckert et al. |
| 7,408,470 B2 | 8/2008 | Wildman et al. |
| 7,420,472 B2 | 9/2008 | Tran |
| 7,430,608 B2 | 9/2008 | Noonan et al. |
| 7,502,498 B2 | 3/2009 | Wen et al. |
| 7,612,679 B1 | 11/2009 | Fackler et al. |
| 7,669,263 B2 | 3/2010 | Menkedick et al. |
| 7,715,387 B2 | 5/2010 | Schuman |
| 7,724,147 B2 | 5/2010 | Brown |
| 7,756,723 B2 | 7/2010 | Rosow et al. |
| 7,890,349 B2 | 2/2011 | Cole et al. |
| 7,893,842 B2 | 2/2011 | Deutsch |
| 7,895,055 B2 | 2/2011 | Schneider et al. |
| 7,908,153 B2 | 3/2011 | Scherpbier et al. |
| 7,945,457 B2 | 5/2011 | Zaleski |
| 7,962,544 B2 | 6/2011 | Torok et al. |
| 7,972,140 B2 | 7/2011 | Renaud |
| 8,108,036 B2 | 1/2012 | Tran |
| 8,123,685 B2 | 2/2012 | Brauers et al. |
| 8,128,596 B2 | 3/2012 | Carter |
| 8,190,447 B2 * | 5/2012 | Hungerford ........... G16H 10/60 705/2 |
| 8,224,108 B2 | 7/2012 | Steinberg et al. |
| 8,237,558 B2 | 8/2012 | Seyed et al. |
| 8,273,018 B1 | 9/2012 | Fackler et al. |
| 8,432,263 B2 | 4/2013 | Kunz |
| 8,451,314 B1 | 5/2013 | Cline et al. |
| 8,529,448 B2 | 9/2013 | Mcnair |
| 8,565,500 B2 | 10/2013 | Neff |
| 8,620,682 B2 | 12/2013 | Bechtel et al. |
| 8,655,680 B2 | 2/2014 | Bechtel et al. |
| 8,700,423 B2 | 4/2014 | Eaton et al. |
| 8,727,981 B2 | 5/2014 | Bechtel et al. |
| 8,769,153 B2 | 7/2014 | Dziubinski |
| 8,890,937 B2 | 11/2014 | Skubic et al. |
| 8,902,068 B2 | 12/2014 | Bechtel et al. |
| 8,917,186 B1 | 12/2014 | Grant |
| 8,953,886 B2 | 2/2015 | King et al. |
| 9,072,929 B1 | 7/2015 | Rush et al. |
| 9,129,506 B1 | 9/2015 | Kusens |
| 9,147,334 B2 | 9/2015 | Long et al. |
| 9,159,215 B1 | 10/2015 | Kusens |
| 9,269,012 B2 | 2/2016 | Fotland |
| 9,292,089 B1 | 3/2016 | Sadek |
| 9,305,191 B2 | 4/2016 | Long et al. |
| 9,367,270 B1 | 6/2016 | Robertson |
| 9,408,561 B2 | 8/2016 | Stone et al. |
| 9,489,820 B1 | 11/2016 | Kusens |
| 9,519,969 B1 | 12/2016 | Kusens |
| 9,524,443 B1 | 12/2016 | Kusens |
| 9,536,310 B1 | 1/2017 | Kusens |
| 9,538,158 B1 | 1/2017 | Rush et al. |
| 9,563,955 B1 | 2/2017 | Kamarshi et al. |
| 9,597,016 B2 | 3/2017 | Stone et al. |
| 9,729,833 B1 | 8/2017 | Kusens |
| 9,741,227 B1 | 8/2017 | Kusens |
| 9,892,310 B2 | 2/2018 | Kusens et al. |
| 9,892,311 B2 | 2/2018 | Kusens et al. |
| 9,892,611 B1 | 2/2018 | Kusens |
| 9,905,113 B2 | 2/2018 | Kusens |
| 9,934,427 B2 | 4/2018 | Derenne et al. |
| 10,078,956 B1 | 9/2018 | Kusens |
| 10,090,068 B2 | 10/2018 | Kusens et al. |
| 10,091,463 B1 | 10/2018 | Kusens |
| 10,096,223 B1 | 10/2018 | Kusens |
| 10,210,378 B2 | 2/2019 | Kusens et al. |
| 10,225,522 B1 * | 3/2019 | Kusens ............... G06V 20/64 |
| 10,342,478 B2 | 7/2019 | Kusens |
| 10,524,722 B2 | 1/2020 | Kusens et al. |
| 10,602,095 B1 | 3/2020 | Kusens |
| 10,643,061 B2 | 5/2020 | Kusens et al. |
| 10,878,220 B2 | 12/2020 | Kusens |
| 10,922,936 B2 * | 2/2021 | Kusens ............... G06T 7/70 |
| 10,922,946 B2 | 2/2021 | Kusens et al. |
| 2002/0015034 A1 | 2/2002 | Malmborg |
| 2002/0038073 A1 | 3/2002 | August |
| 2002/0077863 A1 | 6/2002 | Rutledge et al. |
| 2002/0101349 A1 | 8/2002 | Rojas |
| 2002/0115905 A1 | 8/2002 | August |
| 2002/0183976 A1 | 12/2002 | Pearce |
| 2003/0037786 A1 | 2/2003 | Biondi et al. |
| 2003/0070177 A1 | 4/2003 | Kondo et al. |
| 2003/0092974 A1 | 5/2003 | Santoso et al. |
| 2003/0095147 A1 | 5/2003 | Daw |
| 2003/0135390 A1 | 7/2003 | Obrien et al. |
| 2003/0140928 A1 | 7/2003 | Bui et al. |
| 2003/0227386 A1 * | 12/2003 | Pulkkinen ............ A61B 5/1127 340/8.1 |
| 2004/0019900 A1 | 1/2004 | Knightbridge et al. |
| 2004/0052418 A1 | 3/2004 | Delean |
| 2004/0054760 A1 | 3/2004 | Ewing et al. |
| 2004/0097227 A1 | 5/2004 | Siegel |
| 2004/0116804 A1 | 6/2004 | Mostafavi |
| 2004/0193449 A1 | 9/2004 | Wildman et al. |
| 2005/0038326 A1 | 2/2005 | Mathur |
| 2005/0182305 A1 | 8/2005 | Hendrich |
| 2005/0231341 A1 | 10/2005 | Shimizu |
| 2005/0249139 A1 | 11/2005 | Nesbit |
| 2006/0004606 A1 | 1/2006 | Wendl et al. |
| 2006/0047538 A1 | 3/2006 | Condurso et al. |
| 2006/0049936 A1 | 3/2006 | Collins et al. |
| 2006/0058587 A1 | 3/2006 | Heimbrock et al. |
| 2006/0089541 A1 | 4/2006 | Braun et al. |
| 2006/0092043 A1 | 5/2006 | Lagassey |
| 2006/0107295 A1 | 5/2006 | Margis et al. |
| 2006/0145874 A1 | 7/2006 | Fredriksson et al. |
| 2006/0261974 A1 | 11/2006 | Albert et al. |
| 2007/0033072 A1 | 2/2007 | Bildirici |
| 2007/0083445 A1 | 4/2007 | Garcia et al. |
| 2007/0085690 A1 | 4/2007 | Tran |
| 2007/0118054 A1 | 5/2007 | Pinhas et al. |
| 2007/0120689 A1 | 5/2007 | Zerhusen et al. |
| 2007/0129983 A1 | 6/2007 | Scherpbier et al. |
| 2007/0136102 A1 | 6/2007 | Rodgers |
| 2007/0136218 A1 | 6/2007 | Bauer et al. |
| 2007/0159332 A1 | 7/2007 | Koblasz |
| 2007/0279219 A1 | 12/2007 | Warriner |
| 2007/0296600 A1 | 12/2007 | Dixon et al. |
| 2008/0001735 A1 | 1/2008 | Tran |

(56) References Cited

U.S. PATENT DOCUMENTS

| | | |
|---|---|---|
| 2008/0001763 A1 | 1/2008 | Raja et al. |
| 2008/0002860 A1 | 1/2008 | Super et al. |
| 2008/0004904 A1 | 1/2008 | Tran |
| 2008/0009686 A1 | 1/2008 | Hendrich |
| 2008/0015903 A1 | 1/2008 | Rodgers |
| 2008/0021731 A1* | 1/2008 | Rodgers ............ G08B 21/0469 348/E7.078 |
| 2008/0071210 A1 | 3/2008 | Moubayed et al. |
| 2008/0087719 A1 | 4/2008 | Sahud |
| 2008/0106374 A1 | 5/2008 | Sharbaugh |
| 2008/0126132 A1 | 5/2008 | Warner et al. |
| 2008/0228045 A1 | 9/2008 | Gao et al. |
| 2008/0249376 A1 | 10/2008 | Zaleski |
| 2008/0267447 A1 | 10/2008 | Kelusky et al. |
| 2008/0277486 A1 | 11/2008 | Seem et al. |
| 2008/0281638 A1 | 11/2008 | Weatherly et al. |
| 2009/0082829 A1 | 3/2009 | Panken et al. |
| 2009/0091458 A1* | 4/2009 | Deutsch ................ G16Z 99/00 705/2 |
| 2009/0099480 A1 | 4/2009 | Salgo et al. |
| 2009/0112630 A1 | 4/2009 | Collins et al. |
| 2009/0119843 A1 | 5/2009 | Rodgers et al. |
| 2009/0177327 A1 | 7/2009 | Turner et al. |
| 2009/0224924 A1 | 9/2009 | Thorp |
| 2009/0278934 A1 | 11/2009 | Ecker et al. |
| 2009/0322513 A1 | 12/2009 | Hwang et al. |
| 2009/0326340 A1 | 12/2009 | Wang et al. |
| 2010/0117836 A1 | 5/2010 | Seyed et al. |
| 2010/0169114 A1* | 7/2010 | Henderson ............ G16H 10/60 707/769 |
| 2010/0169120 A1 | 7/2010 | Herbst et al. |
| 2010/0172567 A1 | 7/2010 | Prokoski |
| 2010/0176952 A1 | 7/2010 | Bajcsy et al. |
| 2010/0188228 A1 | 7/2010 | Hyland |
| 2010/0205771 A1 | 8/2010 | Pietryga et al. |
| 2010/0245577 A1 | 9/2010 | Yamamoto et al. |
| 2010/0285771 A1 | 11/2010 | Peabody |
| 2010/0305466 A1 | 12/2010 | Corn |
| 2011/0018709 A1 | 1/2011 | Kornbluh |
| 2011/0022981 A1 | 1/2011 | Mahajan et al. |
| 2011/0025493 A1 | 2/2011 | Papadopoulos et al. |
| 2011/0025499 A1 | 2/2011 | Hoy et al. |
| 2011/0035057 A1 | 2/2011 | Receveur et al. |
| 2011/0035466 A1 | 2/2011 | Panigrahi |
| 2011/0054936 A1 | 3/2011 | Cowan et al. |
| 2011/0068930 A1 | 3/2011 | Wildman et al. |
| 2011/0077965 A1 | 3/2011 | Nolte et al. |
| 2011/0087079 A1 | 4/2011 | Aarts |
| 2011/0087125 A1 | 4/2011 | Causevic |
| 2011/0102133 A1 | 5/2011 | Shaffer |
| 2011/0102181 A1 | 5/2011 | Metz et al. |
| 2011/0106560 A1 | 5/2011 | Eaton et al. |
| 2011/0106561 A1 | 5/2011 | Eaton et al. |
| 2011/0175809 A1 | 7/2011 | Markovic et al. |
| 2011/0190593 A1 | 8/2011 | Mcnair |
| 2011/0227740 A1 | 9/2011 | Wohltjen |
| 2011/0245707 A1 | 10/2011 | Castle et al. |
| 2011/0254682 A1 | 10/2011 | Sigrist |
| 2011/0288811 A1 | 11/2011 | Greene |
| 2011/0295621 A1 | 12/2011 | Farooq et al. |
| 2011/0301440 A1 | 12/2011 | Riley et al. |
| 2011/0313325 A1 | 12/2011 | Cuddihy |
| 2012/0016295 A1 | 1/2012 | Tsoukalis |
| 2012/0025991 A1 | 2/2012 | Okeefe et al. |
| 2012/0026308 A1 | 2/2012 | Johnson et al. |
| 2012/0075464 A1 | 3/2012 | Derenne et al. |
| 2012/0092162 A1 | 4/2012 | Rosenberg |
| 2012/0098918 A1 | 4/2012 | Murphy |
| 2012/0140068 A1* | 6/2012 | Monroe .................. H04N 7/183 348/143 |
| 2012/0154582 A1 | 6/2012 | Johnson et al. |
| 2012/0212582 A1* | 8/2012 | Deutsch ................ G16H 40/20 348/46 |
| 2012/0259650 A1 | 10/2012 | Mallon et al. |
| 2012/0314901 A1 | 12/2012 | Hanson et al. |
| 2012/0323090 A1 | 12/2012 | Bechtel et al. |
| 2012/0323591 A1 | 12/2012 | Bechtel et al. |
| 2012/0323592 A1 | 12/2012 | Bechtel et al. |
| 2013/0027199 A1 | 1/2013 | Bonner |
| 2013/0028570 A1 | 1/2013 | Suematsu et al. |
| 2013/0120120 A1 | 5/2013 | Long et al. |
| 2013/0122807 A1 | 5/2013 | Tenarvitz et al. |
| 2013/0127620 A1 | 5/2013 | Siebers et al. |
| 2013/0184592 A1 | 7/2013 | Venetianer et al. |
| 2013/0265482 A1 | 10/2013 | Funamoto |
| 2013/0309128 A1 | 11/2013 | Voegeli et al. |
| 2013/0332184 A1 | 12/2013 | Burnham et al. |
| 2014/0039351 A1 | 2/2014 | Mix et al. |
| 2014/0070950 A1 | 3/2014 | Snodgrass |
| 2014/0081654 A1 | 3/2014 | Bechtel et al. |
| 2014/0085501 A1 | 3/2014 | Tran |
| 2014/0086450 A1 | 3/2014 | Huang et al. |
| 2014/0108041 A1 | 4/2014 | Bechtel et al. |
| 2014/0155755 A1 | 6/2014 | Pinter et al. |
| 2014/0168397 A1 | 6/2014 | Greco et al. |
| 2014/0191861 A1 | 7/2014 | Scherrer |
| 2014/0191946 A1* | 7/2014 | Cho ...................... G06F 3/013 345/156 |
| 2014/0213845 A1 | 7/2014 | Bechtel et al. |
| 2014/0267625 A1 | 9/2014 | Clark et al. |
| 2014/0267736 A1 | 9/2014 | Delean |
| 2014/0309789 A1* | 10/2014 | Ricci ................... H04W 12/088 700/276 |
| 2014/0327545 A1 | 11/2014 | Bolling et al. |
| 2014/0328512 A1 | 11/2014 | Gurwicz et al. |
| 2014/0333744 A1 | 11/2014 | Baym et al. |
| 2014/0333776 A1 | 11/2014 | Dedeoglu et al. |
| 2014/0354436 A1 | 12/2014 | Nix et al. |
| 2014/0365242 A1 | 12/2014 | Neff |
| 2015/0057635 A1 | 2/2015 | Bechtel et al. |
| 2015/0061891 A1 | 3/2015 | Oleson et al. |
| 2015/0109442 A1 | 4/2015 | Derenne et al. |
| 2015/0206415 A1* | 7/2015 | Wegelin ............... G08B 21/245 340/573.4 |
| 2015/0269318 A1 | 9/2015 | Neff |
| 2015/0278456 A1 | 10/2015 | Bermudez Rodriguez et al. |
| 2015/0294143 A1 | 10/2015 | Wells et al. |
| 2016/0022218 A1 | 1/2016 | Hayes et al. |
| 2016/0070869 A1 | 3/2016 | Portnoy |
| 2016/0093195 A1 | 3/2016 | Ophardt |
| 2016/0127641 A1 | 5/2016 | Gove |
| 2016/0180668 A1* | 6/2016 | Kusens ................. G16H 40/20 340/541 |
| 2016/0183864 A1* | 6/2016 | Kusens ..................... A61B 5/11 340/573.1 |
| 2016/0217347 A1 | 7/2016 | Mineo |
| 2016/0253802 A1 | 9/2016 | Venetianer et al. |
| 2016/0267327 A1* | 9/2016 | Franz ................... A61B 5/0077 |
| 2016/0285416 A1 | 9/2016 | Tiwari et al. |
| 2016/0314258 A1 | 10/2016 | Kusens |
| 2016/0324460 A1 | 11/2016 | Kusens |
| 2016/0360970 A1 | 12/2016 | Tzvieli et al. |
| 2017/0055917 A1 | 3/2017 | Stone et al. |
| 2017/0084158 A1 | 3/2017 | Kusens |
| 2017/0091562 A1 | 3/2017 | Kusens |
| 2017/0109991 A1 | 4/2017 | Kusens |
| 2017/0116473 A1* | 4/2017 | Sashida ............... G06K 9/6218 |
| 2017/0143240 A1 | 5/2017 | Stone et al. |
| 2017/0163949 A1* | 6/2017 | Suzuki ................. H04N 9/3182 |
| 2017/0193177 A1 | 7/2017 | Kusens |
| 2017/0193279 A1* | 7/2017 | Kusens ................... G16H 80/00 |
| 2017/0193772 A1 | 7/2017 | Kusens et al. |
| 2017/0195637 A1 | 7/2017 | Kusens et al. |
| 2017/0214902 A1* | 7/2017 | Braune ................ H04N 13/271 |
| 2017/0289503 A1 | 10/2017 | Kusens |
| 2017/0337682 A1 | 11/2017 | Liao et al. |
| 2018/0018864 A1 | 1/2018 | Baker |
| 2018/0068545 A1 | 3/2018 | Kusens |
| 2018/0104409 A1 | 4/2018 | Bechtel et al. |
| 2018/0114053 A1 | 4/2018 | Kusens et al. |
| 2018/0137340 A1 | 5/2018 | Kusens et al. |
| 2018/0144605 A1 | 5/2018 | Kusens |
| 2018/0189946 A1 | 7/2018 | Kusens et al. |

(56) References Cited

U.S. PATENT DOCUMENTS

| | | |
|---|---|---|
| 2018/0190098 A1 | 7/2018 | Kusens |
| 2018/0357875 A1 | 12/2018 | Kusens |
| 2019/0006046 A1 | 1/2019 | Kusens et al. |
| 2019/0029528 A1 | 1/2019 | Tzvieli et al. |
| 2019/0043192 A1 | 2/2019 | Kusens et al. |
| 2019/0057592 A1 | 2/2019 | Kusens |
| 2019/0205630 A1 | 7/2019 | Kusens |
| 2019/0206218 A1 | 7/2019 | Kusens et al. |
| 2019/0209022 A1 | 7/2019 | Sobol et al. |
| 2019/0228866 A1 | 7/2019 | Weffers-albu et al. |
| 2019/0261915 A1 | 8/2019 | Kusens |
| 2019/0307405 A1 | 10/2019 | Terry et al. |
| 2019/0318478 A1 | 10/2019 | Kusens et al. |
| 2020/0050844 A1 | 2/2020 | Kusens |
| 2020/0143643 A1 | 5/2020 | Kusens et al. |
| 2021/0202052 A1 | 7/2021 | Bechtel et al. |

FOREIGN PATENT DOCUMENTS

| | | |
|---|---|---|
| WO | 2009/018422 A1 | 2/2009 |
| WO | 2012/122002 A1 | 9/2012 |

OTHER PUBLICATIONS

Notice of Allowance received for U.S. Appl. No. 16/654,502, dated Feb. 17, 2021, 9 pages.

Non-Final Office action received for U.S. Appl. No. 16/410,745, dated May 21, 2021, 21 pages.

Non-Final Office Action received for U.S. Appl. No. 16/830,498, dated Sep. 22, 2021, 29 pages.

Non-Final Office Action received for U.S. Appl. No. 17/101,639, dated Sep. 13, 2021, 2021, 13 pages.

Notice of Allowance received for U.S. Appl. No. 16/816,626, dated Sep. 30, 2021, 9 pages.

Quan et al., "Facial Asymmetry Analysis Based on 3-D Dynamic Scans", 2012 IEEE International Conference on Systems, Man, and Cybernetics; COEX, Seoul, Korea; DOI: 10.1109/ICSMC.2012.6378151, Oct. 14-17, 2012, pp. 2676-2681.

Conaire et al., "Fusion of Infrared and Visible Spectrum Video for Indoor Surveillance", WIAMIS, Apr. 2005, 4 pages.

Mooney, Tom, "Rhode Island ER First to Test Google Glass on Medical Conditions", EMS1, Available online at: <https://www.ems1.com/ems-products/technology/articles/1860487-Rhode-Island-ER-first-to-test-Google-Glass-on-medical-conditions/>, Mar. 10, 2014, 3 pages.

Raheja et al., "Human Facial Expression Detection From Detected in Captured Image Using Back Propagation Neural Network", International Journal of Computer Science and Information Technology (IJCSIT), vol. 2, No. 1, Feb. 2010, 9 pages.

"Virtual Patient Observation: Centralize Monitoring of High-Risk Patients with Video", CISCO, Cisco Video Surveillance Manager, 2013, pp. 1-6.

Notice of Allowance received for U.S. Appl. No. 16/410,745, dated Jan. 4, 2022, 10 pages.

Non-Final Office action received for U.S. Appl. No. 17/117,414, dated Jul. 27, 2021, 12 pages.

Pre-interview First Office Action received for U.S. Appl. No. 16/731,274, dated Sep. 1, 2021, 12 pages.

* cited by examiner

METHODS AND SYSTEMS FOR DETECTING PROHIBITED OBJECTS

CROSS-REFERENCE TO RELATED APPLICATIONS

This application is a continuation of U.S. application Ser. No. 16/181,897, filed Nov. 6, 2018 titled "Methods and Systems for Detecting Prohibited Objects," which is hereby incorporated in its entirety by reference.

BACKGROUND

Care facilities, such as hospitals, face many challenges in addition to simply caring for patients. For example, securing patients and equipment (e.g., medical devices) consumes many resources, and current methods lack effectiveness. In addition to requiring personnel to physically monitor locations within the facility, facilities often use visitor logs, visitor badges, and radio-frequency identification (RFID) technology to control access to certain locations within the facility. However, each of these solutions require subjective decision-making and are prone to error by the personnel who are monitoring the locations, assisting visitors signing a visitor log, or issuing visitor badges. Further, none of these methods necessarily prevent an otherwise authorized visitor from breaching areas of the facility where the visitor is not specifically authorized. For example, a visitor may be authorized to visit a particular patient but, based on some condition of the patient, may not have close contact with the patient. In contrast, a caregiver of the same patient may need to have close contact with the patient. In some situations, an authorized visitor may unwittingly provide contraband (e.g., some object a particular patient is not allowed) to a patient that the current methods are unable to detect. Additionally, some objects may be considered contraband or present an immediate danger only when being used in a particular manner. Finally, medical devices are constantly being shuffled between patients and locations within a facility, and tracking the locations of these devices can be extremely difficult. Accordingly, overall security for individuals, such as patients, and equipment suffers, and the many resources currently being utilized for security measures are wasted.

BRIEF SUMMARY

This brief summary is provided as a general overview of the more detailed disclosure which follows. It is not intended to identify key or essential elements of the disclosure, or to define the claim terms in isolation from the remainder of the disclosure, including the drawings.

This disclosure generally relates to methods, systems, and computer storage media for detecting prohibited objects within a monitored area. Generally, and without limitation, the monitored area is associated with an individual to be monitored. For instance, if the individual to be monitored is a patient in a care facility, the monitored area may be a patient room. One or more 3D motion sensors capture image data within the monitored area, and the image data is analyzed by a computerized monitoring system. The computerized monitoring system identifies reference points on an object found within at least part of the monitored area and identifies the object by comparing the reference points to reference points of known objects. The computerized monitoring system then determines whether the object is prohibited. For example, the object may be prohibited for a particular individual, for a particular area in which the individual is located, or for the entire facility in which the individual is located. Upon detecting the prohibited object, the computer monitoring system further determines whether the object is within proximity of at least a hand of a person within the monitored area, such as the monitored individual, a caregiver, or a visitor, and determines whether the object is positioned for imminent use based on at least two reference points of the objects.

One or more designated recipients may be alerted if the prohibited object is determined to be proximate a person within the monitored area and in a position for imminent use. An alerting may be part of an alerting protocol initiated by the computerized monitoring system and may include alerting the monitored individual. In some aspects, after alerting the monitored individual, additional image data is received and analyzed to detect whether a corrective action has been or will be taken. If no response indicative of corrective action is provided, an alert may be sent from a computerized communication system to one or more designated recipients, such as a caregiver. In some aspects, an alert is transmitted to a designated recipient prior to, simultaneously with, or in lieu of an alert being transmitted to the monitored individual In some aspects, this disclosure relates to a system comprising one or more 3D motion sensors, a computerized monitoring system, and a computerized communication system as mentioned above. The prohibited object detection system may further comprise a central video monitoring system communicatively coupled to the computerized communication system. The central video monitoring system may be configured to display an image of the detected object. The central video monitoring system may comprise a primary display and an alert display. The alert display may be a dedicated portion of the primary display or may be a display or series of displays separate from the primary display. The primary display be used to display images or video continuously from the 3D motion sensors, and the alert display may be used for displaying alerts and/or images of a prohibited object when such an object is detected by the computerized monitoring system. Accordingly, in some aspects, the central video monitoring system may be configured to move the display of the image(s) from the primary display to the alert display upon receipt of an alert.

Additional objects, advantages, and novel features of the disclosure will be set forth in part in the description which follows, and in part will become apparent to those skilled in the art upon examination of the following, or may be learned by practice of the disclosure.

BRIEF DESCRIPTION OF THE DRAWINGS

The description references the attached drawing figures, wherein.

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted in the Background, care facilities, such as hospitals, face many challenges in addition to simply caring for patients. For example, securing patients and equipment (e.g., medical devices) consumes many resources, and current methods lack effectiveness. In addition to requiring personnel to physically monitor locations within the facility, facilities often use visitor logs, and visitor badges, and radio-frequency identification (RFID) technology to control access to certain locations within the facility. However, each of these solutions require subjective decision-making and are prone to error by the personnel who are monitoring the locations, assisting visitors signing a visitor log, or issuing visitor badges.

Further, none of these methods necessarily prevent an otherwise authorized visitor from breaching areas of the facility where the visitor is specifically not authorized. For example, a visitor may be authorized to visit a particular patient but, based on some condition of the patient, may not have close contact with the patient. In contrast, a caregiver of the same patient may need to have close contact with the patient. In some situations, an authorized visitor may unwittingly provide contraband (e.g., something or some object a particular patient is not allowed) to a patient that the current methods are unable to detect. Additionally, some objects may be contraband or present an immediate danger only when being used in a particular manner. Finally, medical devices are constantly being shuffled between patients and locations within a facility, and tracking the locations of these devices can be extremely difficult. Accordingly, overall security for individuals, such as patients, and equipment suffers, and the many resources currently being utilized for security measures are wasted. Although these issues are particularly prevalent in healthcare facilities, other types of facilities, such are rehabilitation facilities and detention facilities, face similar concerns.

Figure 1:
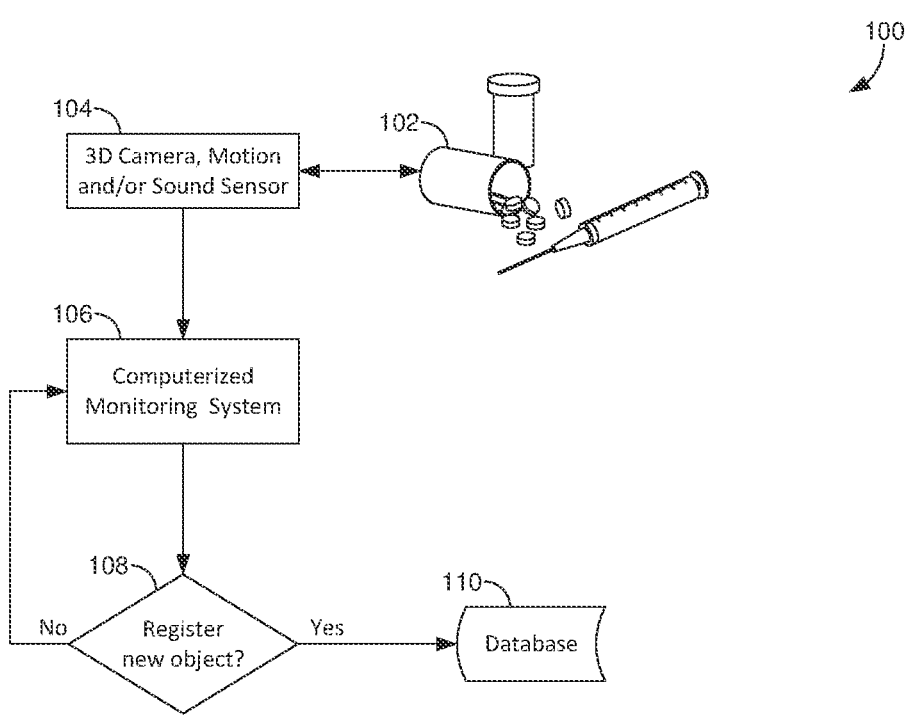
FIGS. 1-6 are exemplary flowcharts for computerized monitoring and object detection systems, in accordance with embodiments of the present disclosure.

As shown in FIG. 1, a system for detecting prohibited objects 100 may include one or more 3D camera, motion, and/or sound sensors 104. Although described as 3D sensors, it is contemplated that at least some aspects of the present invention may be accomplished using 2D sensors. Additionally, this disclosure also refers to the one or more 3D camera, motion, and/or sound sensors 104 as "3D motion sensor" for simplicity, but it is contemplated that the disclosed sensors are configured to perform imaging functions and, in some embodiments, sound capturing functions as described herein.

As used herein, a 3D motion sensor is an electronic device that contains one or more cameras capable of identifying individual objects, people, and motion. In some aspects, the 3D motion sensor 104 may further contain one or more microphones to detect audio. The camera(s) of 3D motion sensor 104 may utilize technologies including but not limited to color RGB, CMOS sensors, lasers, infrared projectors, and RF-modulated light. The 3D motion sensor 104 may have one or more integrated microprocessors and/or image sensors to detect and process information both transmitted from and received by the various cameras. In some embodiment's, 3D motion sensor 104 may be referred to as an image sensor. Exemplary 3D motion sensors include the Microsoft® Kinect® Camera, the Sony® PlayStation® Camera, and the Intel® RealSense™ Camera, each of which happens to include microphones, although sound capture is not essential to some aspects of the disclosure.

A user may be able to configure alerts based on data that is received from the 3D motion sensor 104 and interpreted by a computerized patient monitoring and object system 106 (also referred to as a computerized monitoring system). For example, a user can configure the computerized monitoring system 106 to provide alerts based on data the computerized monitoring system 106 has interpreted for setting zones within a monitored room by comparing data from multiple systems (e.g., RTLS or facial recognition) to detect authorized visitors and/or objects and an individual crossing a trip wire, falling on the ground, or entering/exiting a safety zone.

As used herein, "a sensor" and "sensors" are used interchangeably in the singular and plural unless expressly described as a singular sensor or an array of sensors. A singular sensor may be used, or a sensor may comprise two or more cameras integrated into a single physical unit. Alternately, two or more physically distinct sensors may be used, or two or more physically distinct arrays of sensors may be used.

As used herein, "prohibited object" may be any object in the room being monitored that is not allowed to be in close proximity to a monitored individual. Additionally, rather than being prohibited for a particular person, a prohibited object may include an object prohibited to a particular location. For example, a prohibited object may include any object within the room being monitored that is not allowed to be in that particular room, a room of that type, an area of a facility, or anywhere within the facility.

As shown in FIG. 1, prohibited object detection system 100 may be utilized to register an object in the room of a monitored individual. For example, a 3D motion sensor 104 may detect an object 102 (e.g., medication, food, beverage, drug paraphernalia, tobacco products, weapons, and the like) in the room of the individual. Features of the object 102 may be analyzed by computerized monitoring system 106 and stored in database 110. In some embodiments, the computerized monitoring system 106 may identify the object 102 as well as provide descriptive information relating to object 102. For example, the name of the object, category of the object, types of people for whom the object is prohibited (e.g., categories of individuals with certain food and drink prohibitions or with health and safety concerns), or any other parameters the may be used to configure alerts based on the specific object or category of object.

At step 108, computerized monitoring system 106 may determine whether an identified object 102 has been previously registered. If the object 102 has already been registered in database 110, no further action is taken. If the object is not already registered in database 110, data pertaining to object 102 may be stored in database 110. Such data may include one or more images of object 102 along with the descriptive information, including information indicating whether object 102 is allowed or prohibited and establishing any identification zone requirements.

Figure 2:
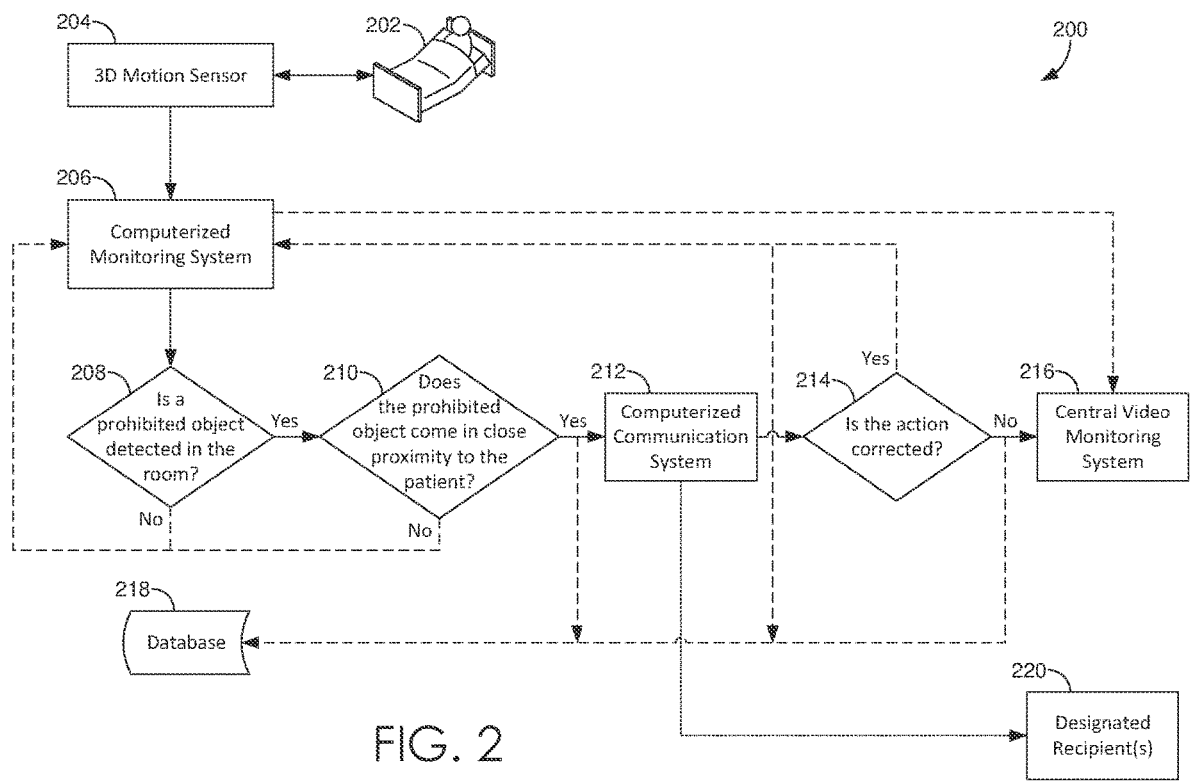

Referring now to FIG. 2, a monitoring and detection system 200 for detecting contraband is illustrated. Monitoring and detection system 200 may comprise a 3D motion sensor 204, a computerized monitoring system 206, a computerized communication system 212, a central video monitoring system 216, and a database 218. The 3D motion sensor 204 may be co-located with a monitored individual 202. The monitored individual 202 may be monitored in a variety of environments, including, without limitation, a hospital, a home, a hospice care facility, a nursing home, an assisted living facility, an outpatient care facility, a rehabilitation facility, a correctional or detention facility, and the like. The 3D motion sensor 204 may be positioned within a room where it is likely to capture images of the face of the individual 202 to be monitored. For example, a 3D motion sensor 204 may be oriented to take images of a bed, chair, or other location where the individual 202 to be monitored may spend a significant amount of time. In some embodiments, the 3D motion sensor 204 may be oriented towards a door or entryway to take images of persons and/or objects entering and exiting the room of the individual 202. In some embodiments, the 3D motion sensor 204 may be oriented to take images of equipment (e.g., medical devices) that may be located in the room of the individual 202 to be monitored. The 3D motion sensor 204 may be permanently installed or may be temporarily set up in a room as needed.

The individual 202 to be monitored may be under immediate care (e.g., in a medical facility under the supervision of a medical professional) or may not be under immediate care (e.g., in a home or other environment, possibly with a caregiver). A caregiver may be a medical professional or paraprofessional, such as an orderly, nurse's aide, nurse, or the like. A caregiver may also be a friend, relative, individual, company, or facility that provides assistance with daily living activities and/or care for individuals, such as individuals who are disabled, ill, injured, elderly, or otherwise in need of temporary or long-term assistance. In some instances, the person to be monitored may be self-sufficient and not under the immediate care of any other person or service provider.

The 3D motion sensor 204 may communicate data, such as images of the individual 202 being monitored (e.g., via skeletal tracking or virtual blob recognition) or an object detected in the room, to a computerized monitoring system 206. The computerized monitoring system 206 is a computer programmed to monitor transmissions of data from the 3D motion sensor 204 and may perform functions previously described for computerized monitoring system 106 of FIG. 1. The computerized monitoring system 206 may be integral to the 3D motion sensor 204 or may be a distinctly separate apparatus from the 3D motion sensor 204. For instance, computerized monitoring system 206 may be in a remote location from 3D motion sensor 204 provided that the computerized monitoring system 206 is directly or indirectly communicatively coupled to the 3D motion sensor 204. The computerized monitoring system 206 may be located in the monitored person's room, such as a hospital room, bedroom, or living room.

The computerized monitoring system 206 may receive data from 3D motion sensor 204 for a monitoring zone (e.g., the patient's room or area to be monitored). At step 208, the computerized monitoring system 206 may assess whether a prohibited object is detected in the room. If a prohibited object is not detected in the room, the computerized monitoring system 206 may continue to analyze images in the monitoring zone as long as 3D motion sensor 204 continues to transmit data. The monitoring zone may be a particular portion of the room in which the individual 202 is located and may be automatically configured or defined by a user in a manner similar as the identification zone described in FIGS. 8-13.

If a prohibited object is detected within the monitoring zone at step 208, computerized monitoring system 206 may, at step 210, determine whether the prohibited object was in proximity to the patient. Computerized monitoring system 206 may establish an identification zone within the monitoring zone that, if crossed by a prohibited object, establishes that the prohibited object was in proximity to the patient. In some embodiments, the identification zone may be generated automatically by computerized monitoring system 206 using a configurable (pre-determined) distance from the monitored individual 202's skeleton or face as identified by the 3D motion sensors 204. Alternatively or additionally, such an identification zone may also be configured by an administrator of the computerized monitoring system 206. Identification zones can be established using any shapes, including, without limitation, rectangles, squares, circles, ovals, triangles, and irregular shapes.

Configuring the identification zone may include computerized monitoring system 206 assigning reference points to identify boundaries of the identification zone. For example, reference points for a zone may define a perimeter around the monitored individual 202. The reference points may be associated with particular structures of or within the room (e.g., wall, floor, bed, chair) or may be based on a predetermined distance from the individual 202 or certain features of the individual 202 (e.g., face, hands). It should be understood that the selection of the reference points may vary with the individual and/or the configuration of the monitoring system 200. Reference points may be configured automatically by the computerized monitoring system 206, may be configured automatically by the computerized monitoring system 206 subject to confirmation and/or modification by a user, or may be configured manually by a user.

On detecting the prohibited object came into close proximity to the patient, such as by entering the identification zone, the computerized communication system 212 may be configured to send an alert of the prohibited object to one or more designated recipients 220 (e.g., caregiver). In some embodiments, computerized communication system 212 may be configured to send an alert of the prohibited object to one or more designated recipients 220 only upon the computerized monitoring system 206 determining that the prohibited object is in close proximity to monitored individual 202 for a predetermined duration of time. Computerized communication system 212 may be an integral part of computerized monitoring system 206. In other embodiments, computerized communication system 212 is implemented using separate software, firmware and/or hardware that is remote from computerized monitoring system 206 while being directly or indirectly communicatively coupled to computerized monitoring system 206.

When an alert is triggered, the alert may be sent, at least initially, to the individual 202 being monitored, to give the individual 202 being monitored an opportunity to respond before alerting other recipients, such as the central video monitoring system 216 and/or designated recipients 220. For example, an audible message may be played in the room where individual 202 is being monitored. The audio message may state a warning or instructions, such as: "Please move the prohibited object away from the patient."

As shown as step 214 in FIG. 2, computerized monitoring system 206 can analyze subsequent image data from 3D motion sensor 204 to determine whether any corrective action was taken. Such corrective action may include the prohibited object being moved out of the identification zone or gestures consistent with a yes or no answer (such as a head nod or shake) to determine if the action has been or will be corrected. In embodiments in which the 3D motion sensor 204 is equipped with a microphone, computerized monitoring system 206 can analyze sound data for recognizable words, such as "okay", "yes", "no", or "help".

In some aspects, the computerized monitoring system 206 may also be communicatively coupled to a central video monitoring system 216. The computerized monitoring system 206 and central video monitoring system 216 may be remotely located at any physical location so long as a wired or wireless data connection exists (e.g., USB, TCP/IP or comparable) between the computerized monitoring system 206, the computerized communication system 212 (if separate from computerized monitoring system 206), the central video monitoring system 216, and the 3D motion sensor(s) 204.

In some aspects, the central video monitoring system 216 may be alerted if no response indicating possible corrective action is received at step 214, or if the response is unintelligible or indicates that the individual 202 being monitored or another person possessing the prohibited object does not intend to comply with the alert and/or instructions. Alternately or additionally, central video monitoring system 216 may be alerted with or even before individual 202, so that central video monitoring system 216 can determine whether the prohibited object detected actually poses a threat. On receiving an alert, the central video monitoring system 216 or an attendant stationed at the system may view live image, video, and/or audio feed from the 3D motion sensor 204 and evaluate whether the prohibited object presents a danger to the monitored individual 202 and/or to others. If individual 202 has been alerted by the computerized communication system 212, the central video monitoring system 216 or an attendant can use the data from 3D motion sensor 204 to evaluate whether a response from individual 202 indicates that individual 202 or a person possessing the prohibited object is complying with the identification zone requirements (i.e., moving the object away from individual 202). Central video monitoring system 216 and/or computerized monitoring system 206 may analyze the response from individual 202 and/or a person possessing the prohibited object. If the response does not include words or gestures recognizable by the system(s), an attendant at central video monitoring system 216 may be able to interpret the person's response. If needed, the central video monitoring system 216 and/or the attendant could then approve initiating an alerts to appropriate designated recipients 220 and/or call for emergency assistance (e.g., send a request for security).

One or more designated recipients 220 local to individual 202 can be alerted with or even before individual 202 and/or central video monitoring system 216, so that the designated recipient 220 can assess what is happening in person. Or, monitored individual 202, designated recipient 220, and the central video monitoring system 216 may all be alerted at the same time. The priority and timing of alerts to different individuals or systems can be configured in accordance with the needs and desires of a particular facility, experience with a particular monitored individual or type of individual, or any other criterion of the system owner or user. This is true for initial alerts as well as continuing alerts (e.g., if a prohibited object is detected in and remains in close proximity to the individual 202, and no response from individual 202 or a caregiver 220 is received or observed) and repeated alerts (e.g., two or more distinct events where a prohibited object is detected in close proximity to the individual 202). Further, the priority and timing of alerts to different individuals may be different for initial, continuing, and/or repeated alerts.

Data associated with alerts may be logged by computerized monitoring system 206 and/or central video monitoring system 216 in a database 218. Data associated with an alert may include, without limitation, the telemetry data from 3D motion sensor 204 that triggered the alert; buffered data preceding the telemetry data that triggered the alert; telemetry data subsequent to the alert; the number and substantive content of alerts; the individual(s) and/or groups to whom an alert was addressed; the response, if any, received or observed following an alert; and combinations thereof. In some embodiments, data associated with the alert may include the video and/or pictures of the prohibited object.

Figure 3:
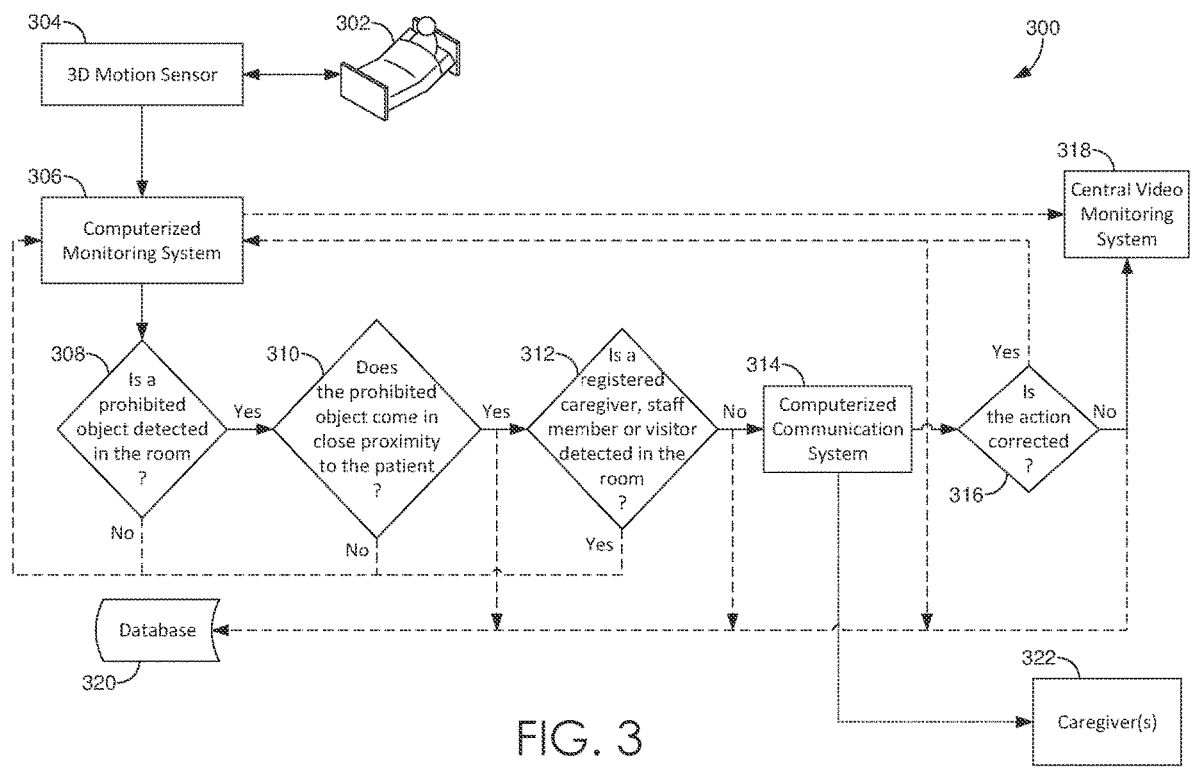

In FIG. 3, a monitoring and detection system 300 is illustrated and comprises a 3D motion sensor 304, a computerized monitoring system 306, a computerized communication system 314, and a central video monitoring system 318. These components of monitoring and detection system 300 may perform the same or similar functions described with respect to system 200 in FIG. 2. For instance, 3D motion sensor 304 may be co-located with an individual 302 to be monitored and may transmit captured data of the individual 302 (such as image data) to the computerized monitoring system 306.

The computerized monitoring system 306 may receive data from 3D motion sensor 304 for a monitoring zone (i.e., the individual 302's room or area to be monitored). At step 308, the computerized monitoring system 306 may detect whether a prohibited object is in the monitoring zone. If a prohibited object is not detected, the computerized monitoring system 306 may continue to analyze images in the monitoring zone as long as 3D motion sensor 304 continues to transmit data.

In detecting and identifying objects, computerized monitoring system 306 may assign reference points to distinctive features of the object. It should be understood that the selection of the reference points may vary with the individual and/or the configuration of the monitoring and detection system 300. Reference points may be configured automatically by the computerized monitoring system 306, may be configured automatically by the computerized monitoring system 306 subject to user confirmation and/or user modification, or may be configured manually by a user. For instance, in some aspects, reference points are assigned to distinctive or key features identified by computerized monitoring system 306 using facial recognition algorithms. The key features identified and used may vary with the kind of technology (e.g., visible vs. infrared light) and/or prominent or accessible features a monitored individual. In some aspects, reference points are identified along the contours of an object.

The reference points corresponding to the object may be compared to a database, such as database 320, storing reference points of known objects, which may include contraband (prohibited objects) and/or acceptable objects. Various machine learning and/or object recognition techniques may additionally be utilized to determine if the object is a known and/or prohibited object. In some embodiments, the database includes reference points of only acceptable objects, and, if no match is found in the database of known or acceptable objects, the object is automatically identified as being a prohibited object. Alternatively, the database may include reference points of only prohibited objects such that any match between the detected object and a known object within the database automatically indicates that the detected object is prohibited. In some embodiments, detecting a prohibited object includes first identifying the object using the reference points and then determining whether the object is prohibited in a particular instance. Determining that the identified object is prohibited may include using information within a patient's electronic health record to determine what, if any, objects may be prohibited for the particular patient. Other types of records indicating restrictions may further be received to determine whether the identified object is restricted or prohibited for the particular individual being monitored, the type of individual being monitored, the area (such as a particular floor or section) of a facility with the individual to be monitored, or the facility in general.

If a prohibited object is detected within the monitoring zone at step 308, computerized monitoring system 306 may, at step 310, determine whether the prohibited object is in close proximity to individual 302. Detecting whether the object and the individual are within close proximity may include determining whether the object is within a threshold proximity (or threshold distance) of the individual. If the prohibited object is not in close proximity to individual 302, the computerized monitoring system 306 may continue to analyze images in the monitoring zone as long as 3D motion sensor 304 continues to transmit data. If, on the other hand, the prohibited object is within close proximity to individual 302 (or, in some embodiments, within close proximity to patient for a configurable duration of time), the computerized monitoring system 306 may determine whether a caregiver 322 or other responsible individual is detected in the room (i.e., such as by using real-time locating systems or facial recognition technologies), as shown at step 312. If a caregiver 322 is detected in the room, the computerized monitoring system 306 may continue to analyze images in the monitoring zone as long as 3D motion sensor 304 continues to transmit data.

If, on the other hand, a caregiver 322 is not detected in the room, computerized monitoring system 306 may initiate an alerting protocol. For example, computerized monitoring system 306 may communicate an image of the prohibited object to the computerized communication system 314, which may be configured to send an alert of the prohibited object to one or more designated recipients (e.g., caregiver(s) 322, security personnel). As described with FIG. 2, when an alert is triggered, the alert may be sent, at least initially, to the individual 302 being monitored, to give the individual 302 an opportunity to respond before alerting the central video monitoring system 318 and/or caregiver(s) 322. Additionally, as shown as step 316 in FIG. 3, computerized monitoring system 306 can analyze subsequent image data and, in some aspects, audio data from 3D motion sensor 304 for corrective action.

Like with central video monitoring system 218 of FIG. 2, central video monitoring system 318 may be alerted if no intelligible response indicating responsible action is received at step 316 or may be alerted with or even before individual 302, so that central video monitoring system 318 can determine whether the prohibited object detected presents a problem. If needed, the central video monitoring system 318 and/or the attendant could then approve alert(s) to appropriate caregiver(s) 322 and/or call for emergency assistance (e.g., send a request for security).

Further as described with respect to FIG. 2, one or more caregiver(s) 322 local to individual 302 can be alerted with or even before individual 302 and/or central video monitoring system 318, or the monitored individual 302, caregiver(s) 322 and the central video monitoring system 318 may all be alerted at the same time. The priority and timing of alerts to different individuals or systems can be configured in accordance with the needs and desires of a particular facility, experience with a particular monitored individual or type of individual, or any other criterion of the system owner or user.

Data associated with alerts may be logged by computerized monitoring system 306 and/or central video monitoring system 318 in a database 320. Data associated with an alert may include, without limitation, the telemetry data from 3D motion sensor 304 that triggered the alert; buffered data preceding the telemetry data that triggered the alert; telemetry data subsequent to the alert; the number and substantive content of an alert; the individual(s) and/or groups to whom an alert was addressed; the response, if any, received or observed following an alert; and combinations thereof.

Figure 4:
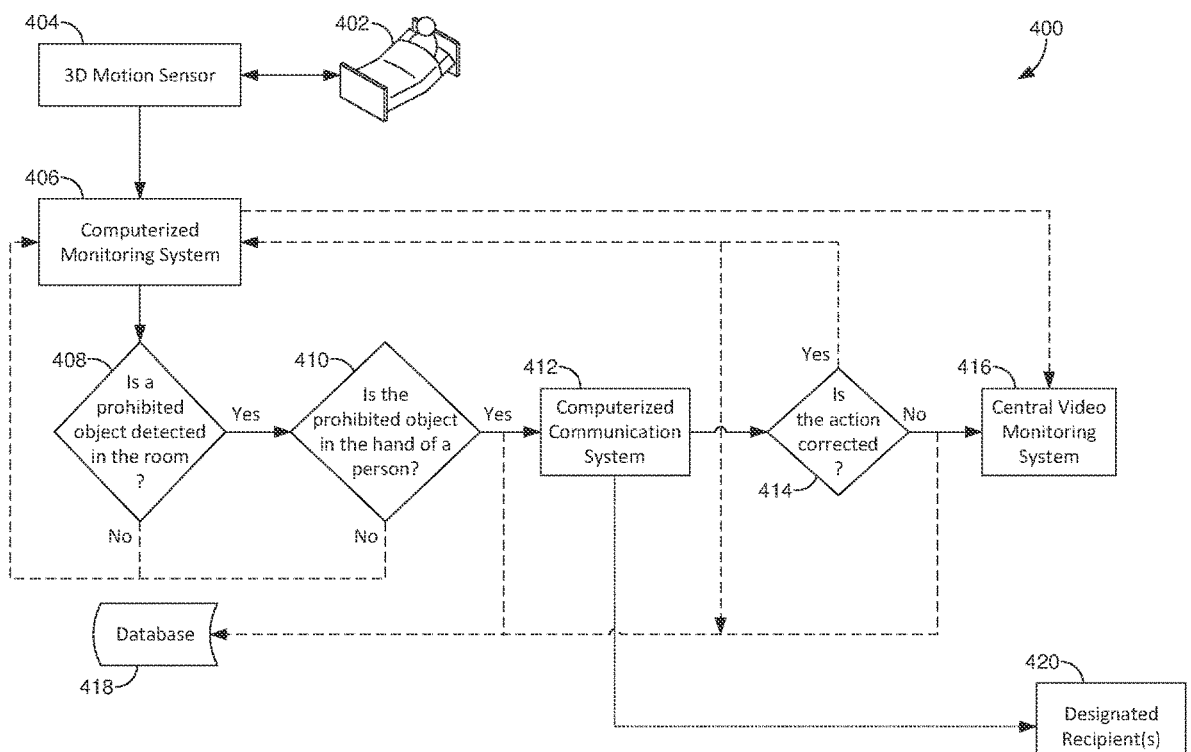

Referring now to FIG. 4, a monitoring and detection system 400 is illustrated. Monitoring and detection system comprises one or more 3D motion sensors 404, a computerized monitoring system 406, a computerized communication system 412, a central video monitoring system 416, and a database 418. These components of monitoring and detection system 400 may perform the same or similar functions described with respect to systems 200 and 300 in FIGS. 2 and 3, respectively. For instance, 3D motion sensor 404 may be co-located with an individual 402 to be monitored and may transmit captured data of the individual 402 (such as images and other description data) to the computerized monitoring system 406 for detection of a prohibited object.

At step 408, the computerized monitoring system 406 may use data received from the one or more 3D motion sensors 404 to assess whether a prohibited object is detected in the room in a manner similar the processes described in FIGS. 2 and 3. If a prohibited object is not detected in the room or other monitoring zone, the computerized monitoring system 406 may continue to analyze images of the monitoring zone as long as 3D motion sensor 404 continues to transmit data.

Detecting and identifying an object may be performed by computerized monitoring system 406 through assignment of reference points to certain features of an object as described for FIG. 3. The reference points corresponding to the object may be compared to reference points of known objects, including prohibited objects and/or acceptable objects. Various machine learning and/or object recognition techniques may additionally be utilized to determine if the object is a known and/or prohibited object.

If a prohibited object is detected within the room or monitoring zone at step 408, computerized monitoring system 406 may, at step 410, determine whether the prohibited object was in proximity to a person, such as the monitored individual 402, a caregiver, a visitor, or another individual. Specifically, in embodiments of system 400, computerized monitoring system 406 detects whether the detected object is in close proximity to one or more hands of such person. As such, computerized monitoring system 406 may use skeletal tracking and/or virtual blob detection to specifically detect a location of an individual's hands, such as the hands of a patient being monitored, a caregiver, or another person present within the monitored zone.

Similar to computerized monitoring system 206 of FIG. 2, computerized monitoring system 406 may establish an identification zone within the monitoring zone that is used to establish and distinguish the identity of the monitored individual 402 from other individuals, such as caregivers or visitors. An identification zone may also be used by computerized monitoring system 406 to make a determination as to whether the prohibited object was in proximity to the monitored individual's hand or to the hand of a caregiver, visitor or other person. The identification zone may be generated in a manner previously discussed with respect to FIG. 2.

Upon detecting the prohibited object came into close proximity to hands of the monitored individual 402 or other person within the monitored zone, an alerting protocol may be automatically initiated. This alerting protocol may be similar to the protocol discussed in FIG. 3. For instance, computerized monitoring system 406 may transmit a determination of the prohibited object being detected to the computerized communication system 412 and/or central video monitoring system 416. Computerized communication system 412 may be configured to then send an alert of the prohibited object to one or more designated recipients 420 (e.g., caregiver). In some embodiments, computerized communication system 412 may be configured to send an alert of the prohibited object to one or more designated recipients 420 only upon determining that the prohibited object has been in close proximity to the hand of the monitored individual 402 or other person for at least a predetermined duration of time (i.e., a threshold amount of time).

As previously described in FIGS. 2 and 3, when an alert is triggered, the alert may be initially sent to the monitored individual 402 or generally to the monitored zone such that the alert, which may include a warning or instructions, can be observed by another individual within the zone. As shown as step 414 in FIG. 4, computerized monitoring system 406 can analyze subsequent image data and, in some embodiments, audio data from 3D motion sensor 404 for corrective action, such as the prohibited object moving out of the hand of the individual 402, caregiver, visitor, or other person or gestures, consistent with a yes or no answer.

Additionally, central video monitoring system 416 may be alerted if no intelligible response indicative of corrective action is received at step 414. Alternately or additionally, central video monitoring system 416 may be alerted with or even before an alert is sent to individual 402 or the monitored zone, so that central video monitoring system 416 can determine whether the prohibited object detected is, in fact, problematic. Such a determination may be done as described further with respect to FIGS. 2 and 3. If it is determined that the prohibited object in proximity to a hand of an individual poses a problem (such as a health, safety, or security threat), the central video monitoring system 416 and/or attendant stationed at the system could then approve alerting designated recipients 420 (such as a caregiver) and/or calling for emergency assistance (e.g., send a request for security).

As with FIGS. 2 and 3, one or more designated recipients 420 local to patient 402 can be alerted with or even before individual 402 and/or central video monitoring system 416, so that the designated recipient 420 can assess what is happening in person. Alternatively, the monitored individual 402, the designated recipient 420, and the central video monitoring system 416 could all be alerted at the same time. The priority and timing of alerts to different individuals or stations can be configured in accordance with the needs and desires of a particular facility, experience with a particular monitored individual or type of individual, or any other user-specified criterion. Additionally, data associated with alerts may be logged by computerized monitoring system 406 and/or central video monitoring system 416 in a database 418 as descried with respect to FIGS. 2 and 3.

Figure 5:
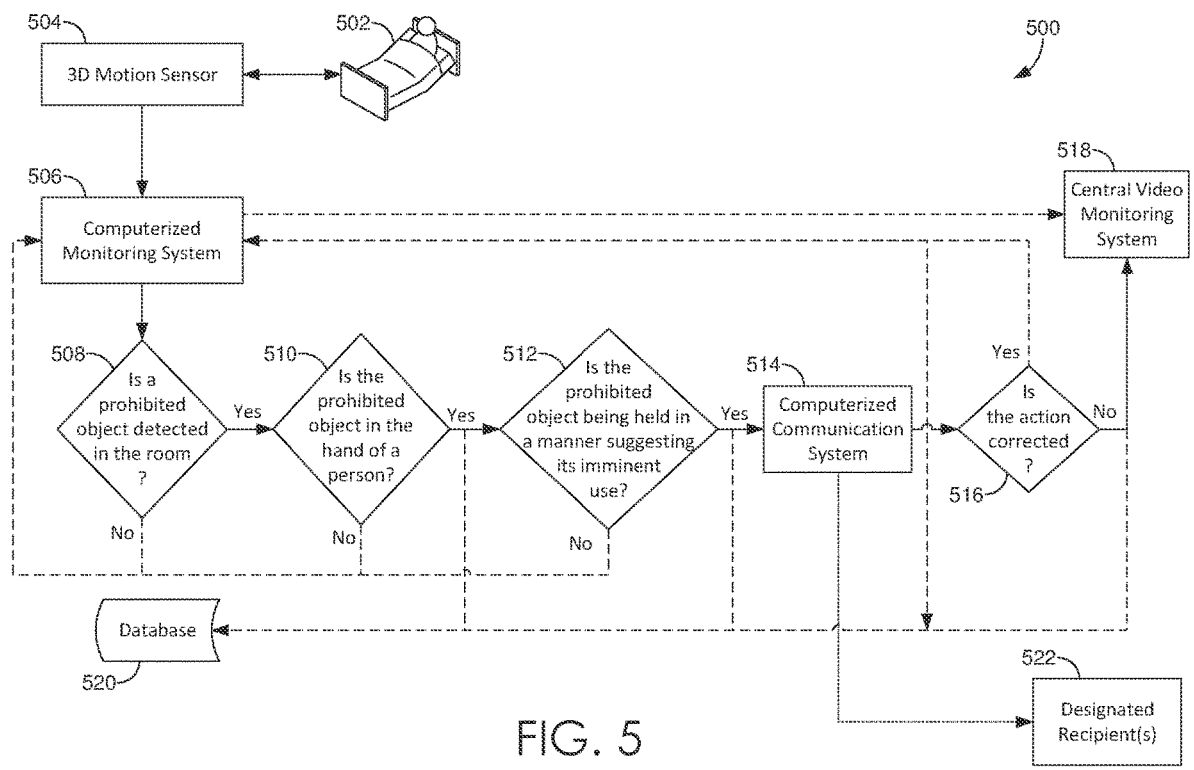

Referring now to FIG. 5, a monitoring and detection system 500 is illustrated. Monitoring and detection system 500 comprises one or more 3D motion sensors 504, a computerized monitoring system 506, a computerized communication system 514, a central video monitoring system 518, and a database 520. These components of monitoring and detection system 500 may perform the same or similar functions described with respect to systems 200, 300, and 400 in FIGS. 2-4. For instance, 3D motion sensor 504 may be co-located with an individual 502 to be monitored and may transmit captured data of the individual 502 (such as images and other description data) to the computerized monitoring system 506 for detection of a prohibited object.

At step 508, the computerized monitoring system 506 may use data received from the one or more 3D motion sensors 504 to assess whether a prohibited object is detected in the room in a manner similar as described in FIGS. 2-4. If a prohibited object is not detected in the room or other monitoring zone, the computerized monitoring system 506 may continue to analyze images in the monitoring zone as long as 3D motion sensor 504 continues to transmit data.

Detecting and identifying an object may be performed by computerized monitoring system 506 through assignment of reference points to certain features of an object as described for FIGS. 3 and 4. The reference points corresponding to the object may be compared to reference points of known objects, including prohibited objects and/or acceptable objects. Various machine learning and/or object recognition techniques may additionally be utilized to determine if the object is a known and/or prohibited.

If a prohibited object is detected within the room or monitoring zone at step 508, computerized monitoring system 56 may, at step 510, determine whether the prohibited object is in proximity to a person, such as the monitored individual 502, a caregiver, a visitor, or another individual. Like computerized monitoring system 406, computerized monitoring system 506 detects whether the detected object is in close proximity to one or more hands of such person, as shown in step 510. As such, computerized monitoring system 506 may utilize skeletal tracking and/or virtual blob detection to specifically detect a location of an individual's hands, such as the hands of a patient being monitored, a caregiver, or another person present within the monitored zone.

Similar to computerized monitoring system 206 of FIG. 2, computerized monitoring system 506 may establish an identification zone within the monitoring zone that is used to establish and distinguish the identity of the monitored individual 502 from other individuals, such as caregivers or visitors. An identification zone may also be used by computerized monitoring system 506 to make a determination as to whether the prohibited object was in proximity to the monitored individual's hand or to the hand of a caregiver, visitor or other person. The identification zone may be generated in a manner previously discussed with respect to FIG. 2.

If the prohibited object is determined to not be held in the hand of an individual within the monitoring zone or identification zone at step 510, the computerized monitoring and system 506 may continue to analyze images in the monitoring zone and/or identification zone as long as 3D motion sensor 504 continues to transmit data. If, on the other hand, the prohibited object is detected as being in the hand of the monitored individual 502 or another individual, the computerized monitoring system 506 may determine whether the prohibited object is being held in a manner consistent with an imminent use of the prohibited object, as shown in step 512.

Determining the prohibited object is being held or is positioned in a manner that is consistent with an imminent use may be performed using reference points assigned to the prohibited object. In exemplary aspects, the spatial relationship between reference points on the object and/or between reference points on the object and points identified on the individual proximate to the prohibited object may be used to determine an orientation of the object. The particular orientation (which may also be referred to herein as the position) may match a known orientation for a use of the object. In other words, detecting that an object is positioned for imminent use may include identifying relative locations of reference points for the object and comparing those relative locations (also referred to wherein as the pattern of reference points) to relative locations for known imminent uses of the object. The locations may be relative to other reference points of the object or relative to reference points of other objects or of people, including reference points on a skeletal outline identified for the monitored or other individual. For instance, if the prohibited object is a gun, computerized monitoring system 506 may determine whether the grip and/or trigger of the identified gun is within an individual's hand. Further, in some aspects, the computerized monitoring system 506 may determine whether the barrel of the detected gun is in a non-vertical position and/or whether the muzzle is aimed at another person. In another example where the prohibited object is a soda bottle (such as where the monitored individual 502 is restricted from drinking), the computerized monitoring system 506 may determine whether a cap has been removed from the top of the bottle and/or whether the shaft of the bottle is in a substantially vertical alignment.

Each prohibited object stored in the database, such as database 520, may be associated with at least one imminent use pattern of reference points identifying a use of the object. In some embodiments, database 520 includes objects with reference point patterns indicating a proper use and/or improper use as some objects may not be strictly prohibited but present a danger when improperly used. As such, computerized monitoring system 506 may determine whether the reference points of the detected object represent a proper use or an improper use. As used herein, a "proper use" refers to a use that does not pose a safety, security, or health concern. For some objects, the use may pose a concern when it is being used as intended. As such, there may be instances in which an object is being used as intended and triggers the alerting protocol.

If the prohibited object is determined to not be held in a manner consistent with its imminent use, the computerized monitoring system 506 may continue to analyze images in the monitoring zone as long as 3D motion sensor 504 continues to transmit data. However, if the prohibited object is determined to be held in the hand in a manner consistent with its imminent use, the computerized monitoring system 506 may initiate an alerting protocol as previously disclosed with respect to FIGS. 2-4. Computerized monitoring system 506 may transmit the determination and, in some instances, an image of the prohibited object, to the computerized communication system 514 and/or the central video monitoring system 518. Computerized communication system 514 may be configured to send an alert of the prohibited object to one or more designated recipients 522, central video monitoring system 518, monitored individual 502 and/or the individual within the monitoring zone detected to be in proximity to the object. In some embodiments, computerized communication system 514 is configured to send an alert of the prohibited object to one or more designated recipients 522 only upon determining that the prohibited object has been in an imminent use position for at least a predetermined duration of time.

Figure 6:
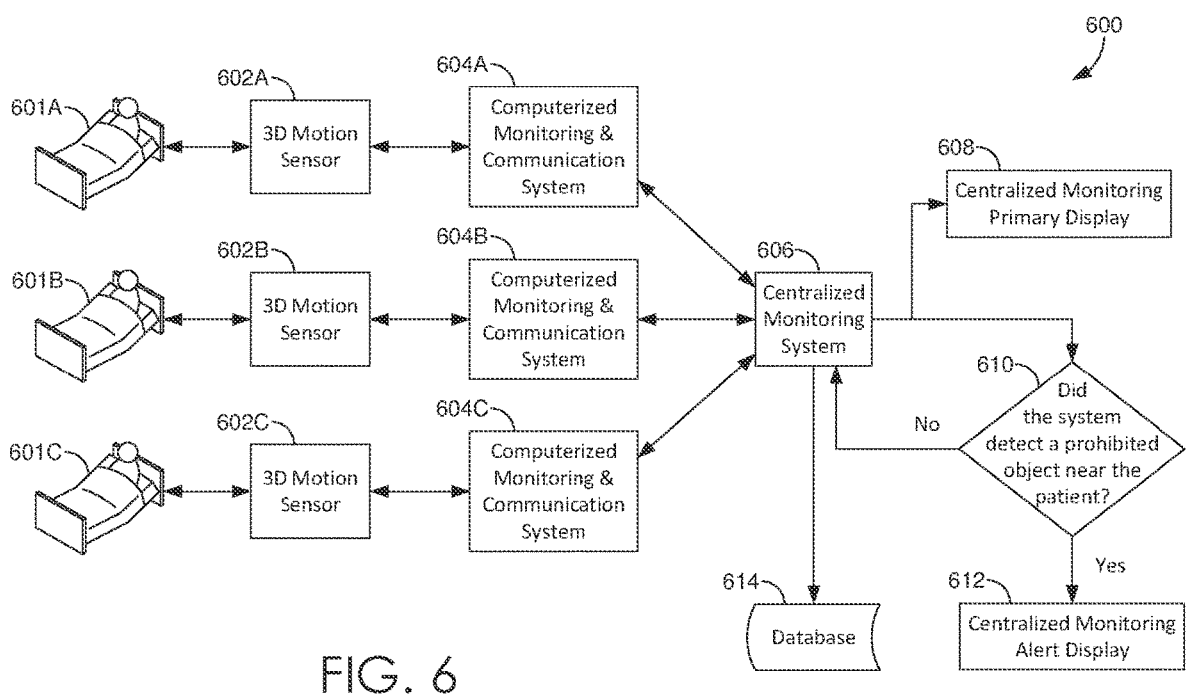

As previously described in FIGS. 2-4, when an alert is triggered, the alert may be initially sent to the monitored individual 502 or generally to the monitored zone and computerized monitoring system 506 can analyze subsequent image data and, in some embodiments, audio data from 3D motion sensor 504 to detect for corrective action, as shown in step 516. Such corrective action may include the prohibited object moving out of the hand of the individual 502, caregiver, visitor, or other person, the prohibited object moving out of an imminent use position, or gestures or words FIG. 6 depicts a monitoring and detection system 600 utilized for separate monitored individuals. As shown in FIG. 6, system 600 includes a centralized monitoring system 606 that receives data from multiple computerized monitoring and communication systems 604A, 604B, 604C. For simplicity, the computerized monitoring and communication systems 604A, 604B, 604C are each shown as a single unit intended to represent computerized monitoring systems and computerized communication systems, which are depicted separately in FIGS. 2-5. Just as in the systems in FIGS. 2-5, it is contemplated that the computerized communication system may be integrated into the computerized monitoring system or may be run as a separate software and/or hardware component that is communicatively coupled to the computerized monitoring system.

Computerized monitoring and communication systems 604A, 604B, 604C receive data from 3D motions sensors 602A, 602B, 602C, which are, respectively, monitoring persons 601A, 601B, 601C. Data, such as image or sound data from the 3D motion sensors or data relating to detections of prohibited objects, may be transmitted from each of the computerized monitoring and communication systems 604A, 604B, 604C to the centralized monitoring system 606. In exemplary aspects, at least some data from the 3D motion sensors 602A, 602B, and 602C, such as image data, may routinely be displayed on centralized monitoring primary display 608 of the centralized monitoring system 606. A single primary display 608 may display data from more than one computerized monitoring and communication systems 604A, 604B, 604C, as shown in view 700 in FIG. 7. Alternately, primary display 608 may comprise two or more distinct screens, each of which may display data from one or more computerized monitoring systems. When displayed in a single display screen, display areas for each computerized monitoring and communication system may be operated and adjusted separately. For instance, as shown, the display for monitored person 701C has an open configuration window 710 specific to monitored person 701C.

When the centralized monitoring system 606 receives an alert from any of the computerized monitoring and communication systems 604A, 604B, 604C indicating that a monitored person 601A, 601B, 601C is in proximity to a prohibited object (including an alert that the object is in proximity to a hand and/or is in an imminent use position) as shown at step 610, audio and/or visual alert information for that particular person and/or the prohibited object may be displayed on the centralized monitoring alert display 612 of centralized monitoring system 606. An alert can be presented in a variety of formats. An alert may be a visual cue on a display screen at the centralized monitoring system 606 (e.g., centralized monitoring alert display 612). A visual cue may include the specific video feed associated with the alert flashing or being highlighted in a color to draw attention to that display among others. An alert may be an audible sound (e.g., a voice or alarm type sound) at the centralized monitoring system 606, an audible sound at the computerized monitoring and communication system attached to the 3D motion sensor, a text message, an email, turning on a light, or running a program on a computer.

If the central monitoring system 606 receives alerts from more than one of the computerized monitoring and communication systems 604A, 604B, 604C, the centralized monitoring alert display 612 may display the video, audio and/or alerting information from all such instances at the same time. In some embodiments, if no alert is received by the centralized monitoring system 606, nothing is displayed on the centralized monitoring alert display 612. Preferably, all monitored individual rooms can be displayed and visible on the centralized monitoring primary display 608 regardless of whether an alert is occurring. When an alert is generated, the user interface of a display, such as centralized monitoring primary display 608, may be altered to attract attention to the particular image of video feed, and/or a duplicative display of the alerting camera can be displayed on a second separate computer monitor (e.g., the centralized monitoring alert display 612). An electronic record of any alerts received, any responses to the alert observed or received, and/or any actions taken by the centralized monitoring system 606 can be stored in a database 614.

Figure 7:
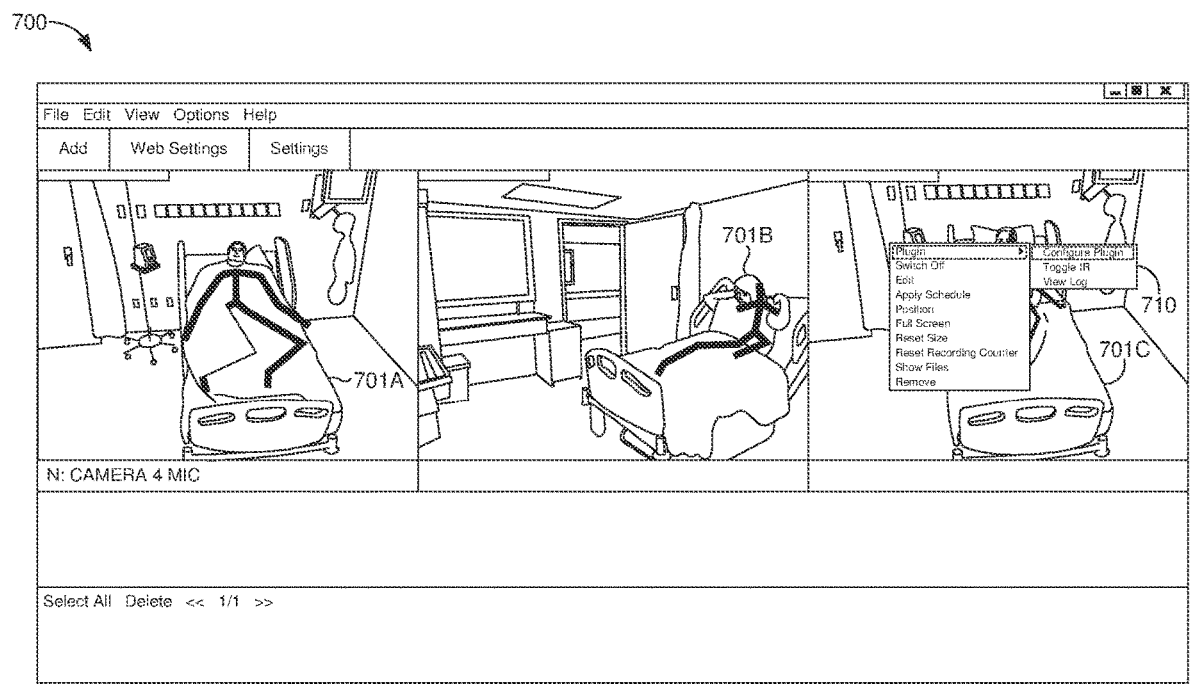
FIGS. 7-19 are exemplary displays for computerized monitoring and object detection systems, in accordance with embodiments of the present disclosure.
Figure 8:
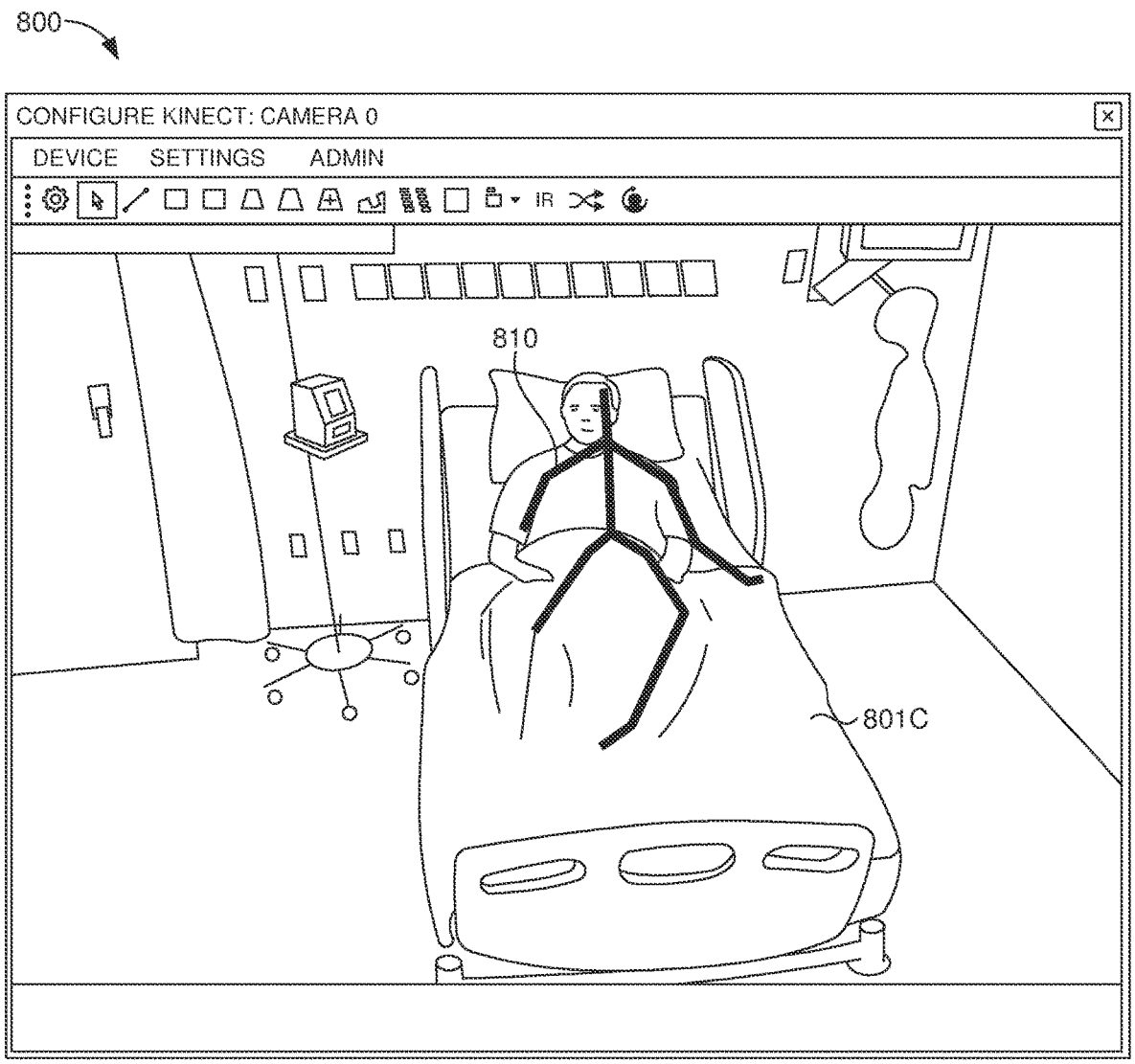

FIG. 7 shows an exemplary view for a central monitoring primary display 700, including video data for multiple monitored persons 701A, 701B, and 701C displayed on a single screen. FIG. 8 shows an alternative view for central monitoring primary display 800 that displays image data for only monitored patient 801C. The user interface in FIG. 8 includes a skeletal FIG. 810, which may represent a skeletal outline of a monitored person identified by a monitoring system, such as computerized monitoring systems 206, 306, 406, and 506 or computerized monitoring and communication systems 604A-C. The skeletal outline may be used to track or "lock on" to the patient 801C. Although a skeletal FIG. 810 is shown in FIG. 8, alternate image analysis may be used, including, without limitation, virtual blob recognition.

Figure 9:
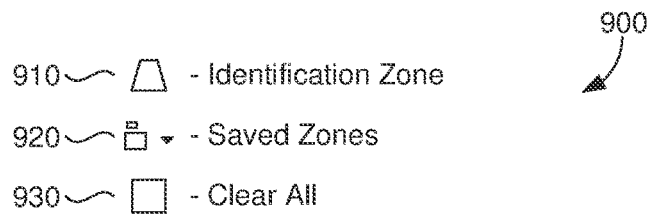

The graphic interface displayed in FIG. 8 does not include markings for any identification zones. FIG. 9, however, shows an exemplary configuration menu 900, with an option 910 for configuring an identification zone, an option 920 for configuring other saved zones (such as a monitoring zone), and an option 930 to clear all configured zones.

Figure 10:
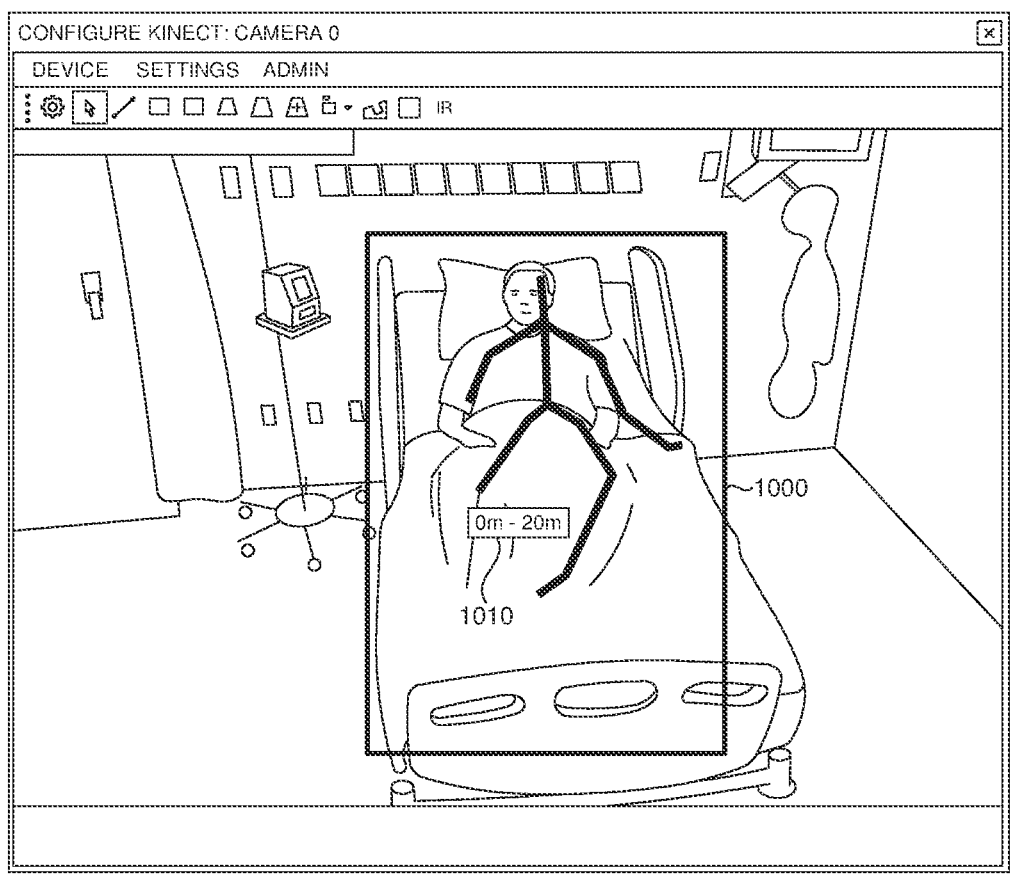

FIG. 10 shows a graphic interface displayed as it might appear upon selecting a menu option from FIG. 9 to configure one or more zones. FIG. 10 shows an identification zone 1000 generally about the upper torso, shoulders, and head of an individual lying in a hospital bed. Identification zone 1000 may be configured by a computerized monitoring system as discussed herein. For example, identification zone 1000 may be defined as a fixed perimeter or volume around the head of an identified individual as determined based on analysis using skeleton figure, blob recognition, and/or facial tracking. In some embodiments, an identification zone that is initially configured by the computerized monitoring system may be modified by a user, or a user may be required or allowed to manually configure the zone.

In some embodiments, a 3D motion sensor monitoring an individual is configured to collect image and/or sound data for a portion of a room or area that is greater than just the identification zone 1000. A computerized monitoring system, such as systems 106, 206, 306, 406, 506, and 604A-C, may analyze only data related to the specified identification zone 1000, with or without capturing images and/or sound from the broader portion of the room. Using an identification zone in this way may reduce total processing capacity required because the most processing-intensive algorithms (e.g., facial tracking, identification and tracking of reference points) are run on a limited data set from the 3D motion sensor. Capturing broader image and/or audio data, however, may help provide context for an alert (e.g., at central video monitoring system). For example, using image and/or audio data from most or all of the room, computerized monitoring system, central video monitoring system, or an attendant using the central video monitoring system may determine that it is unnecessary to send an alert to a designated recipient if there is already a caregiver in the room and tending to the individual being monitored at the time of an alert. Identification zone 1000 may also help the computerized monitoring system "lock on" to a monitored individual and help avoid situations where a monitored individual who is very close to the person possessing a prohibited object might be tracked after moving away from the person. If the person moves out of identification zone 1000, but the individual being monitored does not leave identification zone 1000, computerized monitoring system can continue to monitor the person possessing the prohibited object outside of identification zone 1000.

When identification zone 1000 is configured by a user, the user may operate an input device to select a point on an image or video captured by one of the 3D motion sensors. The user may draw a perimeter defining a zone by dragging the input device (such as an electronic stylus or mouse pointer) around a display screen. The zone may be defined by drawing the zone freehanded or by dragging the input device from a first point to a second point on the display screen to define a diagonal axis for the perimeter of the zone. Other configuration options, including drag-and-drop templates and coordinate identification, could be used. A 2D monitoring zone can be operated as a perimeter while a third dimension of depth can be specified separately. As with the perimeter, the computerized monitoring system can define or recommend a depth measurement, such as shown by label 1010, or the user can provide the depth measurement, as further described below.

Figure 11:
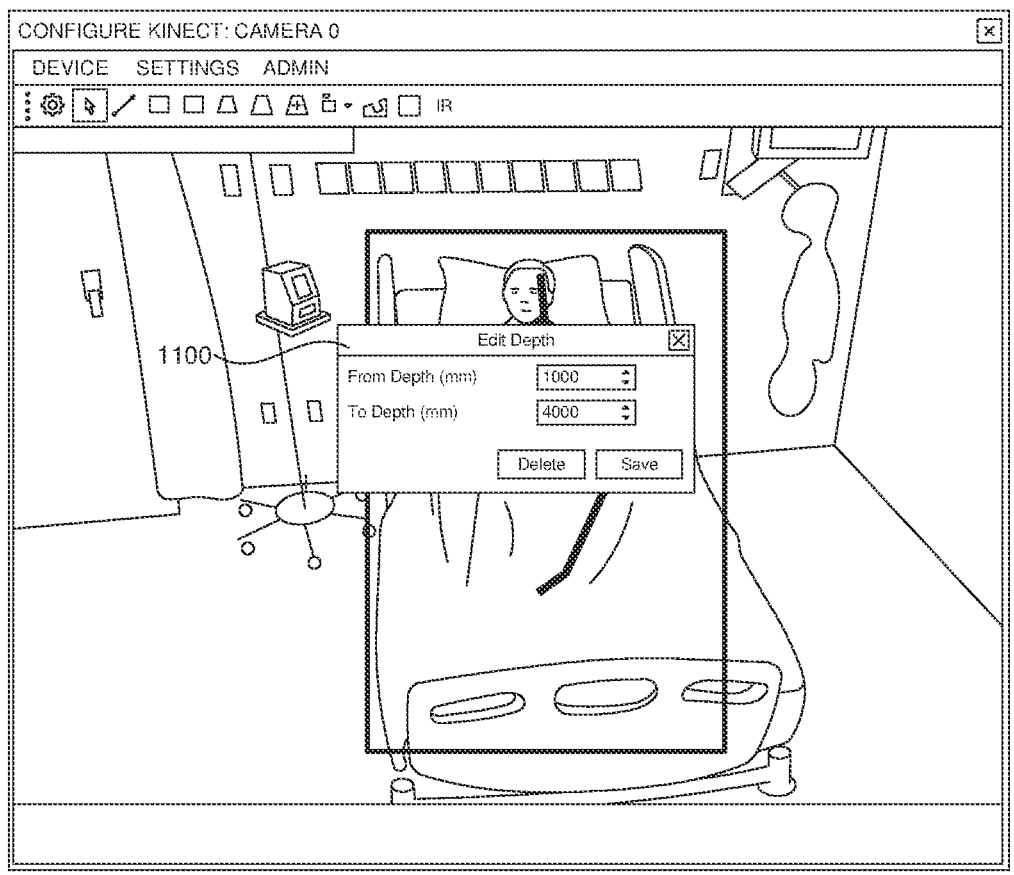
Figure 12:
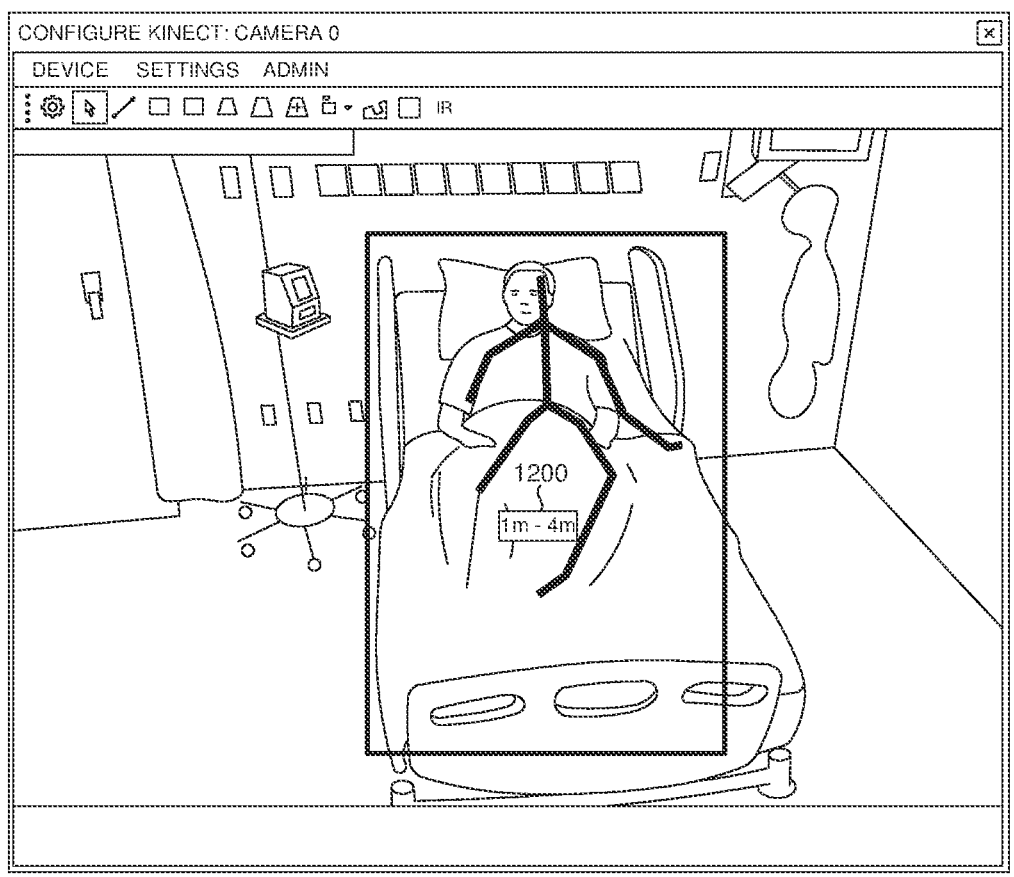

FIG. 11 shows a pop-up menu 1100 allowing a user to configure or reconfigure the depth of a patient identification zone. The exemplary pop-up menu 1100 solicits a depth parameter from a user. The depth parameter solicited in FIG. 11 is specified in millimeters (mm); however, any desired unit of measure could be used, including, without limitation, centimeters, meters, inches, feet, and yards. On setting a depth parameter and while still in a configuration view, the depth of an identification zone may be visible as a label 1200, as shown in FIG. 12. The depth label 1200 may not be visible during routine monitoring and/or alert monitoring, so as not to obscure the person being monitored and/or other activity in any image data from 3D motion sensor.

Figure 13:
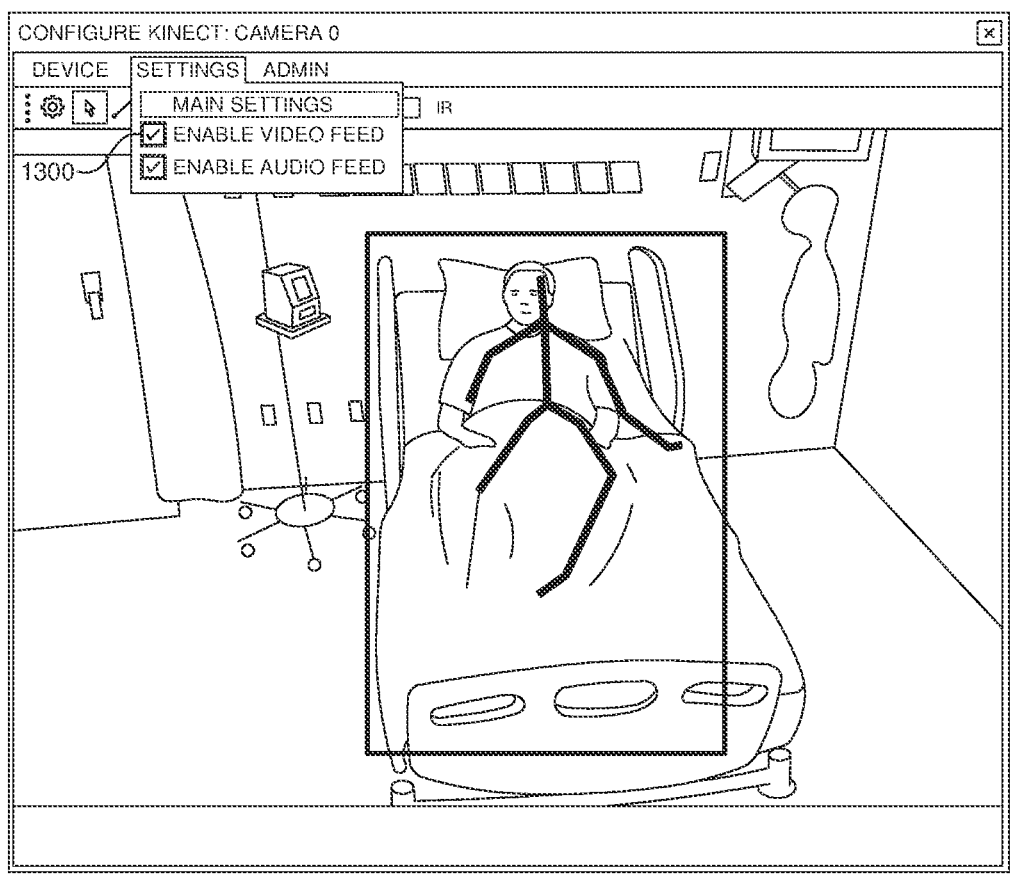

FIG. 13 shows another menu 1300 from configuration view. As shown in FIG. 13, a user may be permitted to turn monitoring on or off (e.g., by "unchecking" video feed and/or audio feed). It may be desirable to disable audio feed, for example, at a central video monitoring system, to prevent overlapping audio feeds from becoming unintelligible noise. If voice or word recognition algorithms are used, those algorithms may run at a computerized monitoring system even if audio feed is disabled at a monitoring station, such as central video monitoring system. Upon an alert issuing or as desired, the audio feed could be enabled for one or more particular persons being monitored, which could provide context for the alert. It also may be desirable to disable audio and/or video feeds to provide some privacy to the individual. For example, it may be desirable to disable audio and/or video feed while the individual is being examined by a medical professional, or bathed, or while visitors are present. The need for computerized monitoring is somewhat reduced while the individual is interacting with medical professionals, caregivers, or visitors. However, if desired, the audio and/or video feed can be maintained even when there are other others with the patient corresponding to the person being monitored.

While the view in FIG. 13 shows an identification zone, in some aspects, identification zones are not visually marked on a user interface outside of the configured screens even though the zones may be configured and operational. In other words, the zones may be configured and operational but are not superimposed on the images of the monitored individuals so as to permit an unobstructed view of individuals.

Figure 14:
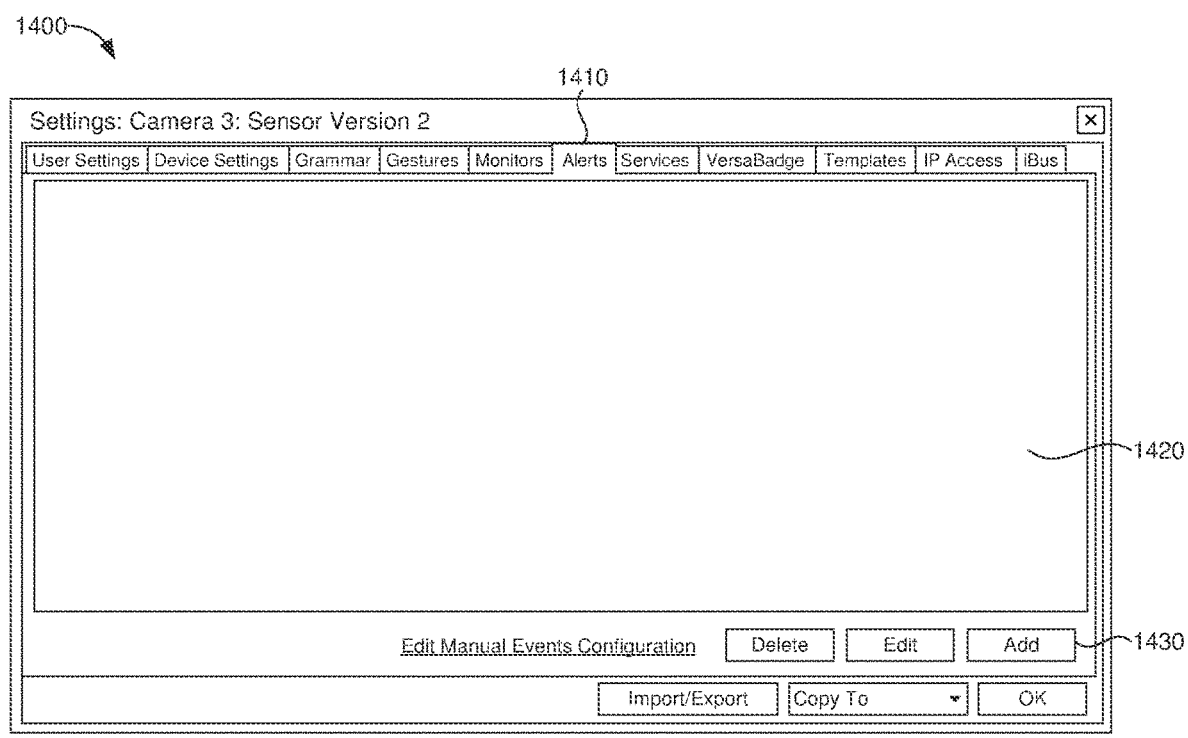

If the "Device" menu option in FIG. 13 is selected, the user may see a pop-up menu 1400, as shown in FIG. 14. The use of pop-up, drop down, tabular, or other kinds of menus may be recommended based on, for example, the number and kinds of options associated with a particular menu. However, different kinds of menus could be presented based on user or facility preferences. Pop-up menu 1400 includes a number of tabs, and an "Alerts" tab 1410 has been selected to display an alerts window 1420 in FIG. 14. The space within the alerts window 1420 is blank, indicating that no alerts have been configured. If a user selects "Add" button 1430 at the bottom of the Alerts tab 1410, a new pop-up menu 1500 may appear, as shown in FIG. 15.

Figure 15:
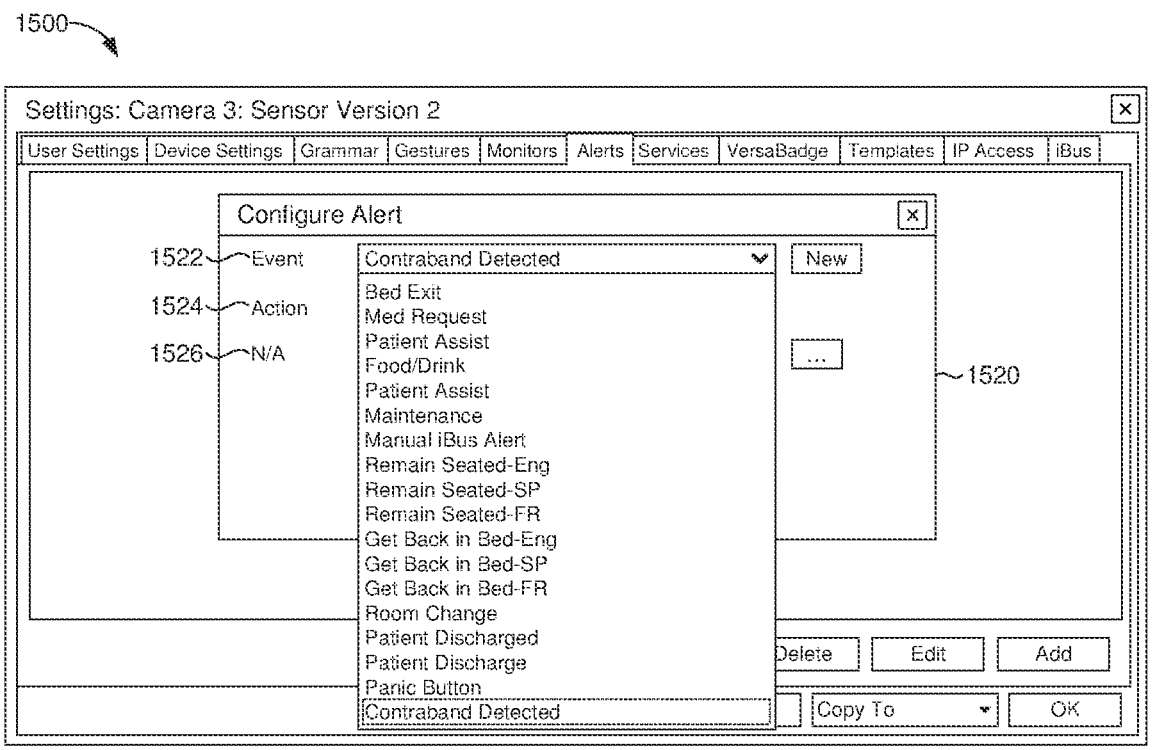

As shown in FIG. 15, pop-up menu 1520 further includes drop-down menus to configure an alert by specifying an event 1522, an action 1524, and, if applicable, an N/A field 1526. The particular words used to describe an event, action, and/or NA field may be modified to reflect the environment in which the system is being used or the facility or personnel using the system. For example, a system, station, or user interface may be configured for use in a hospital using clinical terminology. As another example, a remote central video monitoring system may have an attendant who is not a medical professional, and lay terminology might be used in lieu of or in addition to clinical terminology. Family or other non-professional and/or non-medical caregivers may have access to the monitoring system and/or serve as an attendant for a remote monitoring station. As such, the menus for those users may similarly use descriptive, non-clinical terminology in addition to or in lieu of clinical terminology. Different languages could also be used for different interfaces. As shown in FIG. 15, a monitoring system may include monitoring and/or alert functions unrelated to prohibited objects. If desired, other options may be removed from the drop-down menu to simplify user configuration choices for users who do not want or need access to the other functions. Changes to the menus, including changes to the range of menu options and the terminology used in the menus, may be configured when the system is installed or when access is provided to a specific user, and may not require or may not be available for further modification by routine system users.

Figure 16:
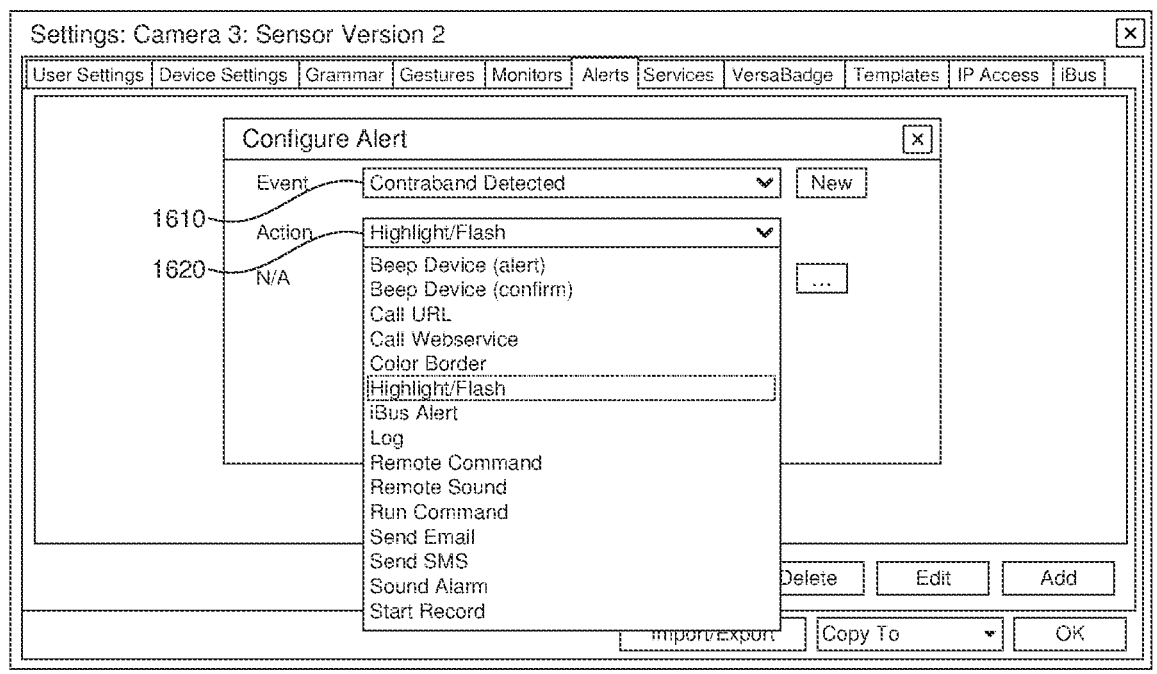

On selection of an event 1522 in FIG. 15, the user may be able to select an action, as shown as action 1610 in FIG. 16. Several of the options provided for an action relate to alerts, such as to provide different audible signals to the 3D motion sensor and/or computerized patient monitoring system; to add or change a color border to a display of image data; to highlight or flash a display of image data; to log an alert; to send e-mail or SMS alerts; or to provide other alerts. As shown in FIG. 16, the user has selected the highlight/flash 1620 option such that a display of image data will be highlighted and/or will flash if the event specified in event 1610 occurs (e.g., if contraband is detected).

Figure 17:
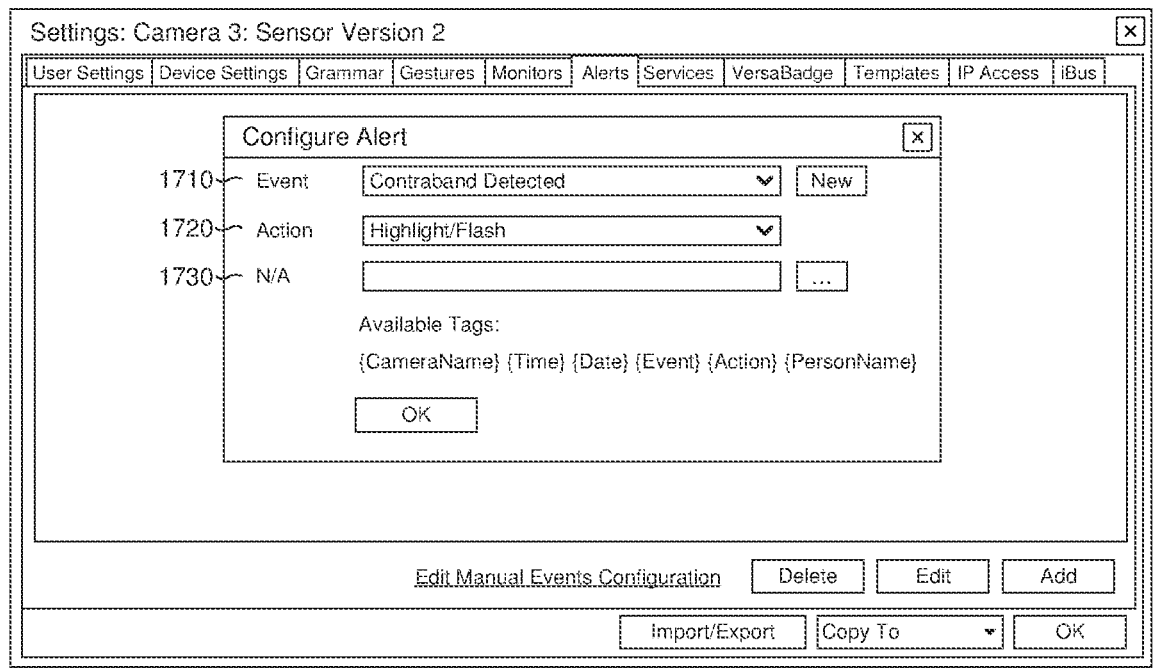

As shown in FIG. 17, N/A field 1730 may be blank and/or inactive depending upon the event 1710 and action 1720 previously selected. In the example shown in FIG. 17, the option to highlight/flash an image display does not require further configuration, and, thus, N/A field 1730 is blank and inactive in that the user cannot input options for N/A field 1730. However, if the action selected was to send an alert, for example, N/A field 1730 might become active and allow a user to designate a recipient and/or recipient group to whom the alert should be sent. If the user desires to send different kinds of alerts to different recipients or groups of recipients, multiple alerts could be configured, with each alert specifying a different action 1720 (e.g., send e-mail vs. send SMS) and/or a different recipient. As another example, the N/A field 1730 could be used to specify where to log the occurrence of an event, for example, if more than one database is available or if data for more than one monitored person is stored in the available database(s).

Figure 18:
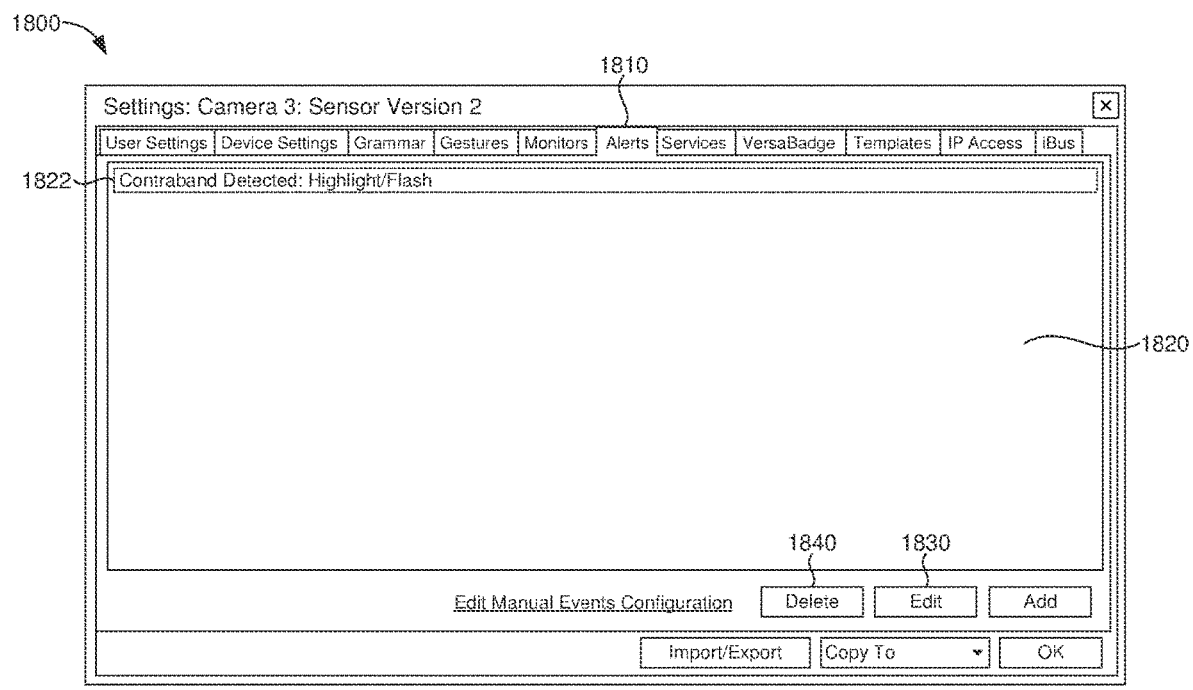

As shown in FIG. 18, after an alert has been configured, the configuration view 1800 displayed may revert to display alert tab 1810, now showing a brief description of configured alert 1822 in alerts window 1820. If additional alerts were configured, alerts window 1820 might display a selectable list of configured alerts, including configured alert 1822. Once configured, alerts may be edited or deleted using buttons 1830 or 1840, respectively. Edit button 1830 may re-open the configuration view shown in FIGS. 15-17, with the drop-down menus open to receive alternate selections.

Figure 19:
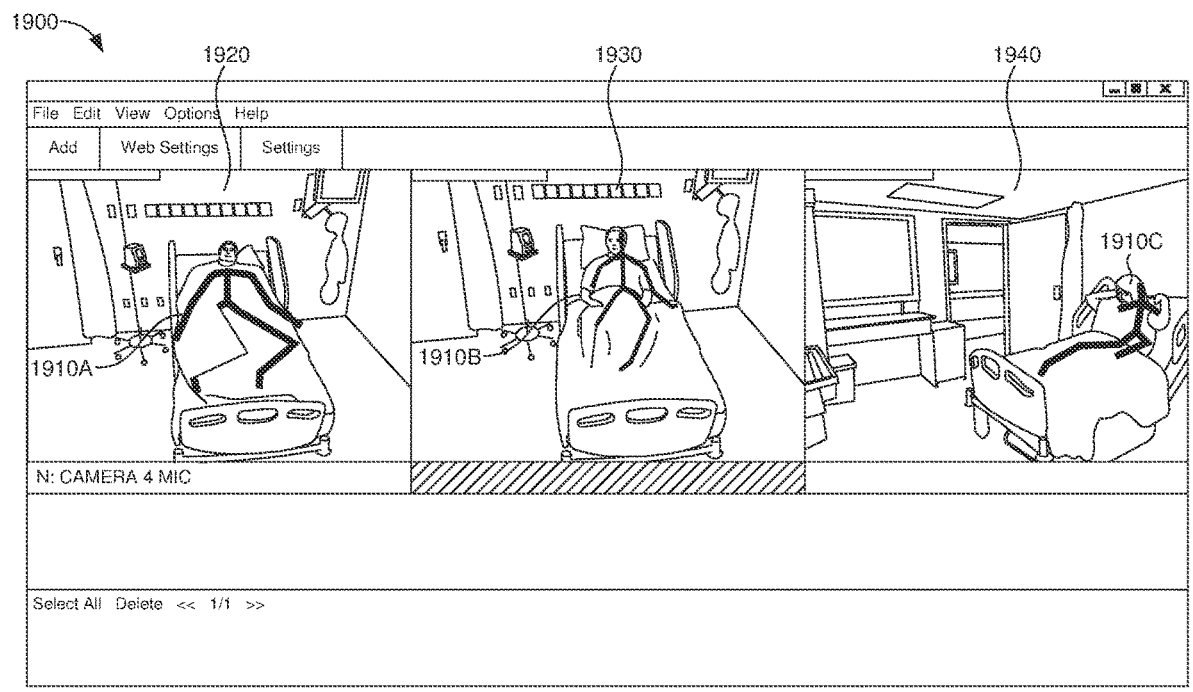

FIG. 19 shows a view 1900 of image data from multiple 3D motion sensors monitoring persons 1910A, 1910B, and 1910C, as such data might appear on a central monitoring primary display disclosed herein. The configuration window has been closed, providing an unobstructed view of monitored persons 1910A-C. Depending upon the configuration for the primary display, each panel 1920, 1930, and 1940 may display live video, intermittent images (e.g., "still" shots from a video data feed), and/or audio data for monitored persons 1910A, 1910B, and 1910C, respectively.

Figure 20:
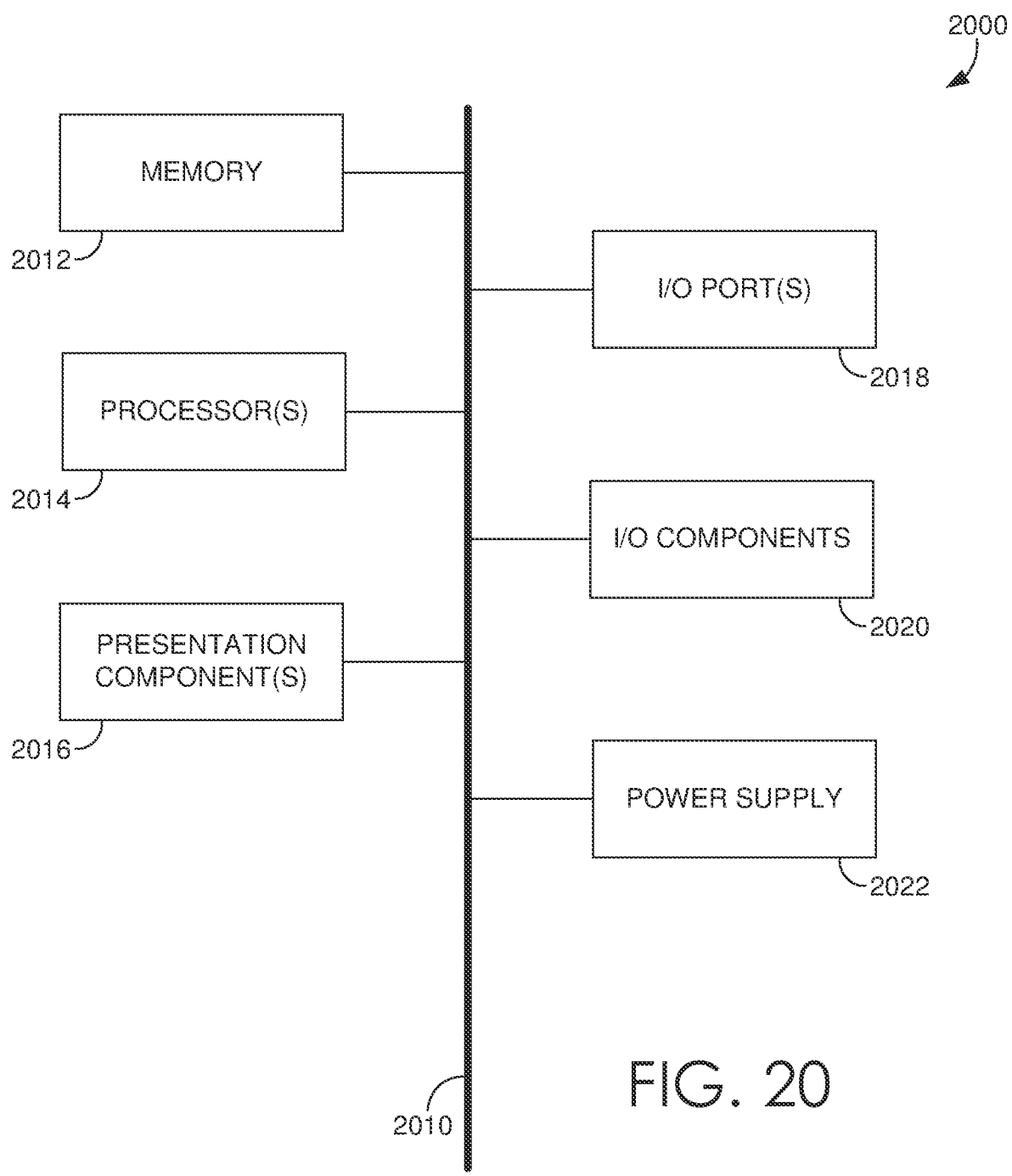
FIG. 20 is a block diagram of an example operating device in which embodiments of the present disclosure may be employed.

Having described an overview of embodiments of the present invention, an exemplary operating environment in which embodiments of the present invention may be implemented is described below in order to provide a general context for various aspects of the present invention. Referring now to FIG. 20 in particular, an exemplary operating environment for implementing embodiments of the present invention is shown and designated generally as computing device 2000. For instance, the various computing systems disclosed herein, such as the computerized patient monitoring and object recognition system, computerized communication system, central video monitoring system, and/or computerized monitoring and communication system may be implemented as one or more devices reflected by example computing device 2000. Computing device 2000 is but one example of a suitable computing environment and is not intended to suggest any limitation as to the scope of use or functionality of the invention. Neither should the computing device 2000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 20, computing device 2000 includes a bus 2010 that directly or indirectly couples the following devices: memory 2012, one or more processors 2014, one or more presentation components 2016, input/output (I/O) ports 2018, input/output components 2020, and an illustrative power supply 2022. Bus 2010 represents what may be one or more busses (such as an address bus, data bus, or combination thereof). Bus 2010 may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus.

Although the various blocks of FIG. 20 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 20 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 20 and reference to "computing device."

Computing device 2000 typically includes a variety of computer-readable media. Computer-readable media can be any available media that can be accessed by computing device 2000 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2000. As used herein, computer storage media does not comprise non-transitory media such as signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2012 includes computer-storage media in the form of volatile and/or nonvolatile memory. The memory may be removable, non-removable, or a combination thereof. Exemplary hardware devices include solid-state memory, hard drives, optical-disc drives, etc. Computing device 2000 includes one or more processors that read data from various entities such as memory 2012 or I/O components 2020. Presentation component(s) 2016 present data indications to a user or other device. Exemplary presentation components include a display device, speaker, printing component, vibrating component, etc.

I/O ports 2018 allow computing device 2000 to be logically coupled to other devices including I/O components 2020, some of which may be built in. Illustrative components include a keyboard, a pointing device (commonly referred to a "mouse"), a trackball, a touch pad, a microphone, a 3D gesture recognition camera or motion sensor as described herein, a joystick, a game pad, a satellite dish, a scanner, a printer, a wireless device, etc. The I/O components 2020 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition associated with a display of the computing device 2000. The computing device 2000 may be equipped with depth cameras, such as stereoscopic camera systems, infrared camera systems, RGB camera systems, touchscreen technology, and combinations of these, for gesture detection and recognition. Additionally, the computing device 2000 may be equipped with accelerometers or gyroscopes that enable detection of motion. The output of the accelerometers or gyroscopes may be provided to the display of the computing device 2000 to render immersive augmented reality or virtual reality.

The computerized systems disclosed herein may operate in a computer network using logical connections to one or more remote computers having a structure or function as described with respect to example computing device 2000. Such remote computers may be located at a variety of locations, for example, but not limited to, hospitals and other inpatient settings, veterinary environments, ambulatory settings, medical billing and financial offices, hospital administration settings, home health care environments, payer offices (e.g., insurance companies), home health care agencies, clinicians' offices and the clinician's home or the patient's own home or over the Internet. Clinicians may include, but are not limited to, a treating physician or physicians, specialists such as surgeons, radiologists, cardiologists, and oncologists, emergency medical technicians, physicians' assistants, nurse practitioners, nurses, nurses' aides, pharmacists, dieticians, microbiologists, laboratory experts, laboratory technologists, genetic counselors, researchers, veterinarians, students, and the like. The remote computers may also be physically located in non-traditional medical care environments so that the entire health care community may be capable of integration on the network.

The remote computers may be personal computers, servers, routers, network PCs, peer devices, other common network nodes, or the like, and may include some or all of the elements described above in relation to the control server. The devices can be personal digital assistants or other like devices.

Exemplary computer networks may include, without limitation, local area networks (LANs) and/or wide area networks (WANs). Such networking environments are commonplace in offices, enterprise-wide computer networks, intranets, and the Internet. When utilized in a WAN networking environment, the control server may include a modem or other means for establishing communications over the WAN, such as the Internet. In a networked environment, program modules or portions thereof may be stored in the control server, in the database 118, or on any of the remote computers. For example, and not by way of limitation, various application programs may reside on the memory associated with any one or more of the remote computers. It will be appreciated by those of ordinary skill in the art that the network connections shown are exemplary and other means of establishing a communications link between the computers may be utilized.

From the foregoing, it will be seen that this disclosure is well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. One or more non-transitory computer storage media having embodied thereon instructions that, when executed by one or more computer processors, causes the one or more computer processors to perform a method comprising:
    receiving image data from one or more 3D motion sensors located to provide the one or more 3D motion sensors with a view of an individual to be monitored in a monitored area;
    based on the image data received from the one or more 3D motion sensors, detecting an object within the monitored area, wherein detecting the object comprises identifying the object using a plurality of reference points of the object;
    determining that a position of the object within the image data is consistent with an improper use by comparing a known position of the improper use of the object to the position of the object within the image data; and
    initiating an alert protocol upon determining that the position of the object is consistent with the improper use.

2. The computer storage media of claim 1, wherein the method performed by the one or more computer processors further comprises, upon detecting the object within the monitored area, detecting that the object is within a threshold proximity of one or more hands of a person within the monitored area.

3. The computer storage media of claim 2, wherein the person within the monitored area is the individual to be monitored, a caregiver, or a visitor.

4. The computer storage media of claim 1, wherein identifying the object comprises comparing the plurality of reference points of the object to reference points of known objects stored within a database and identifying a match with a known object.

5. The computer storage media of claim 1, wherein the improper use is a use that poses a safety, security, or health concern.

6. The computer storage media of claim 5, wherein the known position of the improper use of the object and a known position of a proper use of the object are stored in a database.

7. The computer storage media of claim 1, further comprising receiving information corresponding to an action taken in response to the alert protocol and storing the information in a database.

8. The computer storage media of claim 1, wherein determining that the position of the object is consistent with the improper use comprises determining relative locations of at least two or more reference points of the object and comparing the relative locations with known relative locations associated with the improper use of the object.

9. The computer storage media of claim 8, wherein determining the relative locations of the at least two or more reference points of the object comprises determining locations of at least two or more reference points of the object relative to each other.

10. A computerized method for detecting objects, the method comprising:
    receiving image data from one or more 3D motion sensors located to provide the one or more 3D motion sensors with a view of an individual to be monitored in a monitored area;
    based on image data received from the one or more 3D motion sensors, detecting an object that is within the monitored area, wherein detecting the object comprises identifying the object using a plurality of reference points of the object;
    detecting that a position of the object within the image data is consistent with an improper use by comparing a known position of the improper use of the object to the position of the object within the image data; and
    initiating an alert protocol upon determining that the position of the object is consistent with the improper use.

11. The computerized method of claim 10 further comprising, upon detecting the object within the monitored area, detecting that the object is within a threshold proximity of a person within the monitored area.

12. The computerized method of claim 11, wherein the threshold proximity of the person is determined based on reference points on a skeletal outline for the person.

13. The computerized method of claim 12, wherein detecting that the position of the object within the image data is consistent with the improper use further comprises determining whether a hand of the person is touching a particular portion of the object.

14. The computerized method of claim 11, wherein the threshold proximity is based on an identification zone automatically established based on a predetermined distance from the person within the monitored area, wherein the person within the monitored area comprises one of the individual to be monitored, a visitor, or a caregiver.

15. A system for detecting an object within a monitored area, the system comprising:
    one or more 3D motion sensors located to provide the one or more 3D motion sensors with a view of an individual to be monitored, the one or more 3D motion sensors configured to capture image data of the monitored area;

a computerized monitoring system communicatively coupled to the one or more 3D motion sensors, a processor of the computerized monitoring system configured to utilize the image data received from the one or more 3D motion sensors to:

detect the object in the monitored area using one or more reference points of the object;

determine that a position of the object within the image data is consistent with an improper use by comparing a known position of the object to the position of the object within the image data; and initiate an alert protocol upon determining that the position of the object is consistent with the improper use.

16. The system of claim 15 further comprising a computerized communication system communicatively coupled to the computerized monitoring system, the computerized communication system configured to:

receive a determination from the computerized monitoring system that the position of the object detected is consistent with the improper use; and transmit one or more alerts indicating at least that the object has been detected.

17. The system of claim 16, wherein the computerized monitoring system is configured to transmit an alert to the individual to be monitored.

18. The system of claim 17, wherein the computerized monitoring system is further configured to, after the alert has been transmitted to the individual to be monitored, determine whether a response indicating corrective action has been given based on information subsequently received from the one or more 3D motion sensors.

19. The system of claim 18, wherein the response indicating corrective action includes one or more of an audible response from the individual to be monitored, a gesture indicative of compliance, and the object being moved out of the position consistent with the improper use.

20. The system of claim 15, further comprising a central monitoring system, wherein the alert protocol comprises the central monitoring system receiving the image data captured by the one or more 3D motion sensors and displaying the image data.

* * * * *